(12) United States Patent
Kannan et al.

(10) Patent No.: US 8,301,588 B2
(45) Date of Patent: Oct. 30, 2012

(54) DATA STORAGE FOR FILE UPDATES

(75) Inventors: Naresh Kannan, Seattle, WA (US);
Simon Peter Clarke, Seattle, WA (US);
Simon Skaria, Sammamish, WA (US);
Miko Arnab Sakya Singha Bose,
Seattle, WA (US); Andrew Sean Watson, Seattle, WA (US); Mitesh Pankaj Patel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 12/044,744

(22) Filed: Mar. 7, 2008

(65) Prior Publication Data
US 2009/0228473 A1 Sep. 10, 2009

(51) Int. Cl.
*G06F 17/00* (2006.01)
(52) U.S. Cl. ............................... 707/609; 707/608
(58) Field of Classification Search ............... 707/608, 707/609
See application file for complete search history.

(56) References Cited

U.S. PATENT DOCUMENTS

| | | |
|---|---|---|
| 4,855,580 A | 8/1989 | Van Maanen, Jr. |
| 5,107,443 A | 4/1992 | Smith et al. |
| 5,142,619 A | 8/1992 | Webster, III |
| 5,313,394 A | 5/1994 | Clapp |
| 5,339,389 A | 8/1994 | Bates et al. |
| 5,446,842 A | 8/1995 | Schaeffer et al. |
| 5,486,686 A | 1/1996 | Zdybel |
| 5,535,332 A | 7/1996 | Ishida |
| 5,568,640 A | 10/1996 | Nishiyama |
| 5,623,659 A | 4/1997 | Shi et al. |
| 5,630,138 A | 5/1997 | Raman |
| 5,664,186 A | 9/1997 | Bennett et al. |
| 5,671,428 A | 9/1997 | Muranaga et al. |
| 5,692,178 A | 11/1997 | Shaughnessy |
| 5,729,734 A | 3/1998 | Parker |
| 5,751,958 A | 5/1998 | Zweben |
| 5,781,732 A | 7/1998 | Adams |
| 5,781,908 A | 7/1998 | Williams et al. |

(Continued)

FOREIGN PATENT DOCUMENTS
CN 1804836 A 7/2006
(Continued)

OTHER PUBLICATIONS

International Search Report and Written Opinion for PCT/US2008/081456 / MS 321449.02 mailed Mar. 31, 2009.

(Continued)

*Primary Examiner* — Rehana Perveen
*Assistant Examiner* — Ttiffany Thuy Bui
(74) *Attorney, Agent, or Firm* — Merchant & Gould

(57) ABSTRACT

A storage system according to one embodiment for managing a first file includes a blob storage and a handler. The blob storage may be configured to store data related to the first file temporarily. The handler may be configured to store in the blob storage any data related to the first file and received from an application. The handler also may be configured to transfer at least a portion of the data from the blob storage to persistent storage in response to a commit instruction received from an application or generated by the handler. The handler also may be configured to retrieve any portion of the data stored in the blob storage and to send the same to a requesting application in response to an access request.

13 Claims, 12 Drawing Sheets

U.S. PATENT DOCUMENTS

| | | | |
|---|---|---|---|
| 5,787,262 A | 7/1998 | Shakib et al. | |
| 5,835,950 A | 11/1998 | Cho | |
| 5,963,931 A | 10/1999 | Fagg | |
| 6,000,945 A | 12/1999 | Sanchez-Lazer | |
| 6,006,239 A | 12/1999 | Bhansali et al. | |
| 6,026,461 A | 2/2000 | Baxter et al. | |
| 6,055,546 A | 4/2000 | Pongracz et al. | |
| 6,065,026 A | 5/2000 | Cornelia | |
| 6,067,551 A | 5/2000 | Brown et al. | |
| 6,073,161 A | 6/2000 | DeBoskey et al. | |
| 6,088,702 A | 7/2000 | Plantz | |
| 6,202,085 B1 | 3/2001 | Benson et al. | |
| 6,209,010 B1 | 3/2001 | Gauthier | |
| 6,209,128 B1 | 3/2001 | Gerard et al. | |
| 6,240,414 B1 | 5/2001 | Beizer et al. | |
| 6,244,575 B1 | 6/2001 | Vaartstra | |
| 6,275,935 B1 | 8/2001 | Barlow | |
| 6,317,777 B1 | 11/2001 | Skarbo et al. | |
| 6,324,544 B1 | 11/2001 | Alam et al. | |
| 6,327,584 B1 | 12/2001 | Xian et al. | |
| 6,327,611 B1 | 12/2001 | Everingham | |
| 6,341,291 B1 | 1/2002 | Bentley et al. | |
| 6,342,906 B1 | 1/2002 | Kumar et al. | |
| 6,363,352 B1 * | 3/2002 | Dailey et al. | 715/202 |
| 6,411,965 B2 | 6/2002 | Klug | |
| 6,430,576 B1 | 8/2002 | Gates et al. | |
| 6,438,548 B1 | 8/2002 | Grim, III et al. | |
| 6,438,563 B1 | 8/2002 | Kawagoe | |
| 6,446,093 B2 | 9/2002 | Tabuchi | |
| 6,526,434 B1 | 2/2003 | Carlson et al. | |
| 6,529,905 B1 | 3/2003 | Corsberg et al. | |
| 6,560,614 B1 | 5/2003 | Barboy et al. | |
| 6,560,620 B1 | 5/2003 | Ching | |
| 6,574,377 B1 * | 6/2003 | Cahill et al. | 707/E17.009 |
| 6,610,104 B1 | 8/2003 | Lin et al. | |
| 6,662,209 B2 | 12/2003 | Potts, Jr. et al. | |
| 6,681,371 B1 | 1/2004 | Devanbu | |
| 6,681,382 B1 | 1/2004 | Kakumani | |
| 6,687,878 B1 | 2/2004 | Eintracht et al. | |
| 6,711,718 B2 | 3/2004 | Pfeil et al. | |
| 6,751,618 B1 | 6/2004 | Germscheid et al. | |
| 6,757,678 B2 | 6/2004 | Myllymaki | |
| 6,757,696 B2 | 6/2004 | Multer et al. | |
| 6,757,767 B1 | 6/2004 | Kelleher | |
| 6,757,871 B1 | 6/2004 | Sato et al. | |
| 6,760,840 B1 | 7/2004 | Shimbo et al. | |
| 6,772,165 B2 | 8/2004 | O'Carroll | |
| 6,842,768 B1 | 1/2005 | Shaffer | |
| 6,854,087 B1 | 2/2005 | Takeo et al. | |
| 6,925,476 B1 | 8/2005 | Multer et al. | |
| 6,976,213 B1 | 12/2005 | Letourneau et al. | |
| 6,983,416 B1 | 1/2006 | Bae | |
| 6,993,522 B2 | 1/2006 | Chen et al. | |
| 7,007,235 B1 | 2/2006 | Hussein et al. | |
| 7,024,429 B2 | 4/2006 | Ngo et al. | |
| 7,024,430 B1 | 4/2006 | Ingraham et al. | |
| 7,039,679 B2 | 5/2006 | Mendez et al. | |
| 7,047,407 B2 | 5/2006 | Itoh | |
| 7,053,839 B2 | 5/2006 | Cassel | |
| 7,058,663 B2 | 6/2006 | Johnston et al. | |
| 7,065,633 B1 | 6/2006 | Yates, Jr. | |
| 7,069,505 B2 | 6/2006 | Tamano | |
| 7,089,278 B1 | 8/2006 | Churchill et al. | |
| 7,110,936 B2 | 9/2006 | Hiew | |
| 7,111,237 B2 | 9/2006 | Chan | |
| 7,124,151 B1 | 10/2006 | Choi | |
| 7,124,362 B2 | 10/2006 | Tischer | |
| 7,127,501 B1 | 10/2006 | Beir et al. | |
| 7,149,776 B1 | 12/2006 | Roy et al. | |
| 7,155,465 B2 | 12/2006 | Lee et al. | |
| 7,185,277 B1 | 2/2007 | Bernstein et al. | |
| 7,200,668 B2 | 4/2007 | Mak | |
| 7,203,708 B2 | 4/2007 | Liu et al. | |
| 7,209,948 B2 | 4/2007 | Srinivasa | |
| 7,225,189 B1 | 5/2007 | McCormack et al. | |
| 7,240,091 B1 | 7/2007 | Hopmann et al. | |
| 7,249,314 B2 | 7/2007 | Walker | |
| 7,293,049 B2 | 11/2007 | Kadyk et al. | |
| 7,310,657 B2 | 12/2007 | Nakamura | |
| 7,315,978 B2 | 1/2008 | Giles | |
| 7,328,243 B2 | 2/2008 | Yeager | |
| 7,346,705 B2 | 3/2008 | Hullot | |
| 7,401,291 B2 | 7/2008 | Ramaley | |
| 7,496,577 B2 | 2/2009 | Williamson | |
| 7,529,780 B1 | 5/2009 | Braginsky et al. | |
| 7,536,641 B2 | 5/2009 | Rosenstein et al. | |
| 7,565,603 B1 | 7/2009 | Jones et al. | |
| 7,577,906 B2 | 8/2009 | Friedrichowitz | |
| 7,594,163 B2 | 9/2009 | Slack-Smith | |
| 7,603,357 B1 | 10/2009 | Gourdol | |
| 7,610,287 B1 | 10/2009 | Dean | |
| 7,647,292 B2 | 1/2010 | Hayashi | |
| 7,650,336 B1 | 1/2010 | Herrmann | |
| 7,664,750 B2 | 2/2010 | Frees | |
| 7,694,217 B2 | 4/2010 | Croft | |
| 7,714,222 B2 | 5/2010 | Taub | |
| 7,761,784 B2 | 7/2010 | Parks | |
| 7,788,326 B2 | 8/2010 | Buchheit | |
| 7,792,788 B2 | 9/2010 | Melmon | |
| 7,839,532 B2 | 11/2010 | Brawn | |
| 7,912,811 B2 | 3/2011 | Hodel-Widmer | |
| 7,941,399 B2 | 5/2011 | Bailor | |
| 7,962,853 B2 | 6/2011 | Bedi et al. | |
| 8,019,780 B1 | 9/2011 | Pinkerton et al. | |
| 8,028,229 B2 | 9/2011 | Bailor | |
| 2001/0018697 A1 | 8/2001 | Kunitake et al. | |
| 2002/0007287 A1 | 1/2002 | Straube et al. | |
| 2002/0022122 A1 | 2/2002 | Hirata | |
| 2002/0065848 A1 | 5/2002 | Walker et al. | |
| 2002/0069192 A1 | 6/2002 | Aegerter | |
| 2002/0188598 A1 | 12/2002 | Myllymaki | |
| 2003/0028600 A1 | 2/2003 | Parker | |
| 2003/0093760 A1 | 5/2003 | Suzuki | |
| 2003/0097410 A1 * | 5/2003 | Atkins et al. | 709/206 |
| 2003/0097638 A1 | 5/2003 | Tamano | |
| 2003/0115481 A1 | 6/2003 | Baird | |
| 2003/0140067 A1 | 7/2003 | Sesek | |
| 2003/0159105 A1 | 8/2003 | Hiebert | |
| 2003/0167281 A1 | 9/2003 | Cohen et al. | |
| 2003/0172113 A1 | 9/2003 | Cameron et al. | |
| 2003/0172168 A1 | 9/2003 | Mak et al. | |
| 2003/0208534 A1 | 11/2003 | Carmichael | |
| 2004/0039829 A1 | 2/2004 | Bucher | |
| 2004/0068505 A1 * | 4/2004 | Lee et al. | 707/100 |
| 2004/0107224 A1 | 6/2004 | Bera | |
| 2004/0122870 A1 | 6/2004 | Park et al. | |
| 2004/0122898 A1 | 6/2004 | Srinivasa | |
| 2004/0122912 A1 | 6/2004 | Kim et al. | |
| 2004/0133858 A1 | 7/2004 | Barnett | |
| 2004/0143630 A1 | 7/2004 | Kaufmann | |
| 2004/0172395 A1 | 9/2004 | Edelstein et al. | |
| 2004/0177343 A1 | 9/2004 | McVoy | |
| 2004/0199550 A1 | 10/2004 | Ito et al. | |
| 2004/0205539 A1 | 10/2004 | Mak | |
| 2004/0205653 A1 | 10/2004 | Hadfield et al. | |
| 2004/0230903 A1 | 11/2004 | Elza et al. | |
| 2004/0239700 A1 | 12/2004 | Baschy | |
| 2004/0243644 A1 | 12/2004 | Steere et al. | |
| 2005/0004990 A1 | 1/2005 | Durazo | |
| 2005/0033811 A1 | 2/2005 | Bhogal et al. | |
| 2005/0071386 A1 | 3/2005 | Wolfgang | |
| 2005/0097440 A1 | 5/2005 | Lusk et al. | |
| 2005/0177617 A1 | 8/2005 | Banginwar | |
| 2005/0198132 A1 | 9/2005 | Vellante | |
| 2005/0203962 A1 | 9/2005 | Zhou | |
| 2005/0210392 A1 * | 9/2005 | Koide et al. | 715/751 |
| 2005/0216524 A1 | 9/2005 | Gomes et al. | |
| 2005/0223066 A1 | 10/2005 | Buchheit | |
| 2005/0234943 A1 | 10/2005 | Clarke | |
| 2005/0240858 A1 | 10/2005 | Croft et al. | |
| 2005/0251738 A1 | 11/2005 | Hirano et al. | |
| 2005/0256907 A1 | 11/2005 | Novik et al. | |
| 2005/0262203 A1 | 11/2005 | Buchheit | |
| 2005/0289512 A1 | 12/2005 | Matsusaka | |
| 2006/0015539 A1 | 1/2006 | Wolf | |
| 2006/0015811 A1 | 1/2006 | Tanaka | |
| 2006/0020360 A1 | 1/2006 | Wu | |

| | | | |
|---|---|---|---|
| 2006/0031264 A1 | 2/2006 | Bosworth et al. | |
| 2006/0041596 A1 | 2/2006 | Stirbu et al. | |
| 2006/0047656 A1 | 3/2006 | Dehlinger | |
| 2006/0053194 A1 | 3/2006 | Schneider | |
| 2006/0053195 A1 | 3/2006 | Schneider et al. | |
| 2006/0080432 A1 | 4/2006 | Spataro et al. | |
| 2006/0085402 A1 | 4/2006 | Brown et al. | |
| 2006/0101328 A1 | 5/2006 | Albornoz | |
| 2006/0106879 A1 | 5/2006 | Zondervan et al. | |
| 2006/0123033 A1 | 6/2006 | Livshits | |
| 2006/0136511 A1 | 6/2006 | Ngo et al. | |
| 2006/0136809 A1 | 6/2006 | Fernstrom | |
| 2006/0200755 A1 | 9/2006 | Melmon et al. | |
| 2006/0218476 A1 | 9/2006 | Gombert | |
| 2006/0242549 A1 | 10/2006 | Schwier | |
| 2006/0248038 A1* | 11/2006 | Kaplan et al. | 707/1 |
| 2006/0259524 A1 | 11/2006 | Horton | |
| 2007/0066293 A1 | 3/2007 | Peng | |
| 2007/0118598 A1 | 5/2007 | Bedi et al. | |
| 2007/0130334 A1 | 6/2007 | Carley | |
| 2007/0186157 A1 | 8/2007 | Walker et al. | |
| 2007/0186171 A1 | 8/2007 | Junuzovic et al. | |
| 2007/0198952 A1 | 8/2007 | Pittenger | |
| 2007/0203917 A1 | 8/2007 | Du et al. | |
| 2007/0226320 A1 | 9/2007 | Hager et al. | |
| 2007/0226604 A1 | 9/2007 | Chalasani et al. | |
| 2007/0271502 A1 | 11/2007 | Bedi et al. | |
| 2007/0283321 A1 | 12/2007 | Hegde | |
| 2008/0028300 A1 | 1/2008 | Krieger et al. | |
| 2008/0059187 A1 | 3/2008 | Roitblat et al. | |
| 2008/0059539 A1 | 3/2008 | Chin | |
| 2008/0072141 A1* | 3/2008 | Hodel-Widmer | 707/200 |
| 2008/0086718 A1 | 4/2008 | Bostic | |
| 2008/0097993 A1 | 4/2008 | Nanba | |
| 2008/0098294 A1 | 4/2008 | Le | |
| 2008/0114740 A1 | 5/2008 | Vergottini | |
| 2008/0126953 A1 | 5/2008 | Davidson | |
| 2008/0147590 A1 | 6/2008 | Bechtel | |
| 2008/0177782 A1 | 7/2008 | Poston | |
| 2008/0180740 A1 | 7/2008 | Kimura et al. | |
| 2008/0195800 A1* | 8/2008 | Lee et al. | 711/103 |
| 2008/0235579 A1 | 9/2008 | Champion et al. | |
| 2008/0256113 A1 | 10/2008 | Rasmussen | |
| 2008/0256114 A1 | 10/2008 | Rasmussen | |
| 2008/0263032 A1 | 10/2008 | Vailaya et al. | |
| 2008/0270386 A1 | 10/2008 | Ohi | |
| 2008/0294895 A1 | 11/2008 | Bodner | |
| 2008/0320384 A1 | 12/2008 | Nagarajan | |
| 2009/0006936 A1 | 1/2009 | Parker | |
| 2009/0006946 A1 | 1/2009 | Hanson et al. | |
| 2009/0006948 A1 | 1/2009 | Parker | |
| 2009/0063489 A1 | 3/2009 | Neumann | |
| 2009/0094231 A1 | 4/2009 | Marvit et al. | |
| 2009/0094242 A1* | 4/2009 | Lo et al. | 707/8 |
| 2009/0157811 A1 | 6/2009 | Bailor | |
| 2009/0171987 A1* | 7/2009 | Coppinger et al. | 707/100 |
| 2009/0193331 A1 | 7/2009 | Croft | |
| 2009/0228473 A1 | 9/2009 | Kannan | |
| 2009/0235158 A1 | 9/2009 | Rosenstein et al. | |
| 2009/0249224 A1 | 10/2009 | Davis et al. | |
| 2009/0271696 A1 | 10/2009 | Bailor | |
| 2009/0282041 A1 | 11/2009 | Skaria | |
| 2009/0282462 A1 | 11/2009 | Skaria | |
| 2009/0327294 A1 | 12/2009 | Bailor | |
| 2010/0023562 A1 | 1/2010 | Kreuch et al. | |
| 2010/0070464 A1 | 3/2010 | Aymeloglu et al. | |
| 2010/0088676 A1 | 4/2010 | Yuan | |
| 2010/0095198 A1 | 4/2010 | Bultrowicz et al. | |
| 2010/0131836 A1 | 5/2010 | Dukhon | |
| 2010/0281074 A1 | 11/2010 | Bailor et al. | |
| 2011/0055702 A1 | 3/2011 | Jakobson | |
| 2011/0184906 A1 | 7/2011 | Bailor | |

FOREIGN PATENT DOCUMENTS

| | | |
|---|---|---|
| CN | 101042702 A | 9/2007 |
| DE | 19844071 A1 | 4/1999 |
| EP | 1290575 B1 | 6/2005 |
| EP | 1681652 A2 | 7/2006 |
| JP | 2005310158 A | 11/2005 |
| KR | 10-0331685 B1 | 4/2002 |
| KR | 1020060047218 A | 5/2006 |
| TW | 200424868 A | 11/2004 |
| TW | 200627259 A | 12/2005 |
| WO | 01/25986 A2 | 4/2001 |
| WO | WO 01/33362 A1 | 5/2001 |
| WO | 01/88750 A1 | 11/2001 |
| WO | WO 02/33575 A2 | 4/2002 |
| WO | WO 2005/114467 A2 | 12/2005 |
| WO | WO 2007/034858 A1 | 3/2007 |
| WO | WO 2007/062949 A1 | 6/2007 |
| WO | WO 2009/061638 | 5/2009 |
| WO | WO 2009/076010 | 6/2009 |
| WO | WO 2009/079116 | 6/2009 |
| WO | WO 2009/134548 | 11/2009 |
| WO | WO 2009/154842 | 12/2009 |
| WO | WO 2009/158108 | 12/2009 |

OTHER PUBLICATIONS

US Office Action (Non-Final) for U.S. Appl. No. 11/938,082, mailed Dec. 28, 2009.

"Codeville," http://codeville.org/, 2 pages (Date Retrieved Oct. 9, 2007).

Galli, R., "Journal File Systems in Linux," http://bulma.net/impresion.phtml?nIdNoticia=1154, 15 pages (Jan. 24, 2002).

"Status of Software Reuse 577," http://www.plex86.org/Computer_Folklore/Status-of-Software-Reuse-577.html, 2 pages (Date Retrieved Oct. 9, 2007).

International Search Report and Written Opinion for PCT/US2008/083862 / MS 321998.02 mailed Mar. 31, 2009, 11 pages.

Synchronous Collaborative Text Document Editing Online: MoonEdit, reviewed Sep. 13, 2007, pp. 104, http://www.masternewmedia.org/news/2005/02/20/synchronous_collaborative_text_document-editing.htm.

US Office Action (Non-Final) for U.S. Appl. No. 11/957,010, mailed Mar. 18, 2010, 32 pages.

Adkins et al.; GSS Collaboration in Document Development: Using Group Writer to Improve the Process, Proceedings of the 32nd Hawaii International Conference on System Sciences, Copyright © 1999 IEEE, 11 pages.

International Search Report and Written Opinion for PCT/US2009/039316, mailed Jan. 18, 2010, 11 pages.

"File Locks—GNU Emacs Lisp Reference Manual"; www.gnu.org/software/emacs/elisp/html_node/File-Locks.html; Mar. 28, 2006; 2 pages.

"Google, Google Docs & Spreadsheets Tour" downloaded from http://www.google.com/google-d-s/intl/en/tour2.html on Nov. 9, 2007 (1 page).

Adler et al., "Evaluating and Implementing a Collaborative Office Document System," 2005, pp. 1-18, http://www.sce.carleton.ca/faculty/adler/publications/2005/adler-nash-noel-2005-Collab-Office.pdf.

Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, pp. 1-10, http://www.crpit.com/confpapers/CRPITV62Citro.pdf.

Green, Bob, "Converting Qedit to the Client/Server Model", http://www.robelle.com/library/papers/client-server/, 14 pages (Copyright 2004).

Haake et al., "Collaborative Authoring of Hypermedia Documents," Machine Translation Today, Translating and the Compute 15, pp. 41-58, Aslib:London 1993, pp. 1-18, http://www.pi6.fernuni-hagen.de/publ/MT-93.pdf.

Hebsgarrd, Poul J; Process Driven Document Management™, Version 6.1, Feb. 2007, pp. 1-13, http://www.brain-technology.com/upload/file_vk306c6tr779p9gntgho_16467.pdf.

Ignat et al., "Extending Real-Time Collaborative Editing Systems with Asynchronous Communication," Institute for Information Systems, ETH Zurich, (at least as early as Oct. 4, 2007) pp. 1-6, http://www.inf.ethz.ch/personal/ignat/Publications/cscwd_04.pdf.

Koch, Michael, "Design Issues and Model for a Distributed Multi-User Editor" (pp. 1-21), from *Computer Supported Cooperative Work, An International Journal*, 3(3-4), 19995, pp. 359-378.

La Fontaine, Robin, Monsell EDM Ltd., Merging XMLFiles: a new approach providing intelligent merge of XML data sets, Presented at XML Europe 2002, 21 pages, http://www.deltaxml.com/dxml/93/version/default/part/AttachmentData/data/merging-xml-files.pdf.

Microsoft Corporation, Compare and Merge Mechanisms, © 2007, 1 page, http://msdn2.microsoft.com/en-us/library/ek8hk7e2(VS.80,d=printer).aspx.

Miller et al.; "Interactive Simultaneous Editing of Multiple Text Regions"; www.co-ode.org/resources/papers/k-cap2007-seidenberg.pdf; Jun. 2001; 15 pages.

Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.

Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, pp. 1-2. http://cims.clayton.edu/jpreston/PhD/Research/Preston%20-%20CSCW%20Demo%20Extended%20Abstract.pdf.

Synchronous Collaborative Text Document Editing Online: MoonEdit, reviewed Sep. 13, 2007, pp. 1-4, http://www.masternewmedia.org/news/2005/02/20/synchronous_collaborative_text_document_editing.htm.

Seidenberg et al; "A Methodology for Asynchronous MultiUser Editing of Semantic Web Ontologies"; www.xmpp.org/extensions/xep-0058.html; Mar. 28, 2006; 8 pages.

Shchepin; "XEP-0058: Multi-User Text Editing"; http://groups.csail.mit.edu/uid/projects/simuledit/usenix01.pdf; Oct. 9, 2007; 5 pages.

Tichy, Walter F., RCS—A System for Version Control, Jan. 3, 1991, 20 pages, http://www.svlug.org/teams/rcs.pdf.

U.S. Appl. No. 11/938,082, filed Nov. 9, 2007, Confirmation No. 3133.

U.S. Appl. No. 11/951,973, filed Dec. 6, 2007, Confirmation No. 9364.

U.S. Appl. No. 11/957,010, filed Dec. 14, 2007, Confirmation No. 8535.

U.S. Appl. No. 12/111,174, filed Apr. 28, 2008, Confirmation No. 6839.

U.S. Appl. No. 12/117,025, filed May 8, 2008, Confirmation No. 8234.

U.S. Appl. No. 12/117,040, filed May 8, 2008, Confirmation No. 8262.

Wilde, Erik, "Multi-User Multimedia Editing with the MultimETH System," Swiss Federal Institute of Technology, CH 8092, Zurich, (at least as early as Oct. 10, 2007) pp. 1-9, http://dret.net/netdret/docs/wilde-tikrep18.pdf.

Google, "Share and Collaborate in Real Time," 2008, 1 page, http://www.google.com/google-d-s/intl/en/tour2.html.

McKechan et al., "Design Considerations for Creditor: A Collaborative Report Writing Editor," 10 pages, accessed May 16, 2008, http://userpages.umbc.edu/~jcampbel/Group01/McKechan_paper_iwces3.pdf.

U.S. Appl. No. 12/145,536, filed Jun. 25, 2008, Bailor et al., Confirmation No. 3462, 20 pages.

US Final Office Action for U.S. Appl. No. 11/938,082, mailed Jun. 29, 2010.

US Final Office Action for U.S. Appl. No. 11/957,010, mailed Aug. 18, 2010.

US Non-Final Office Action for U.S. Appl. No. 12/117,025, mailed Sep. 21, 2010.

Heckel, Paul; "A Technique for Isolating Differences between Files" copyright 1978, 5 pages.

International Preliminary Report and Written Opinion for PCT/US/2008/083069 / MS 321999.02 mailed May 29, 2010, 6 pages.

Lu et al., "Merging Retrieval Results in Hierarchical Peer-to-Peer Networks" SIGIR '04, Jul. 25-29, 2004, 2 pages.

Ohst et al., "Difference Tools for Analysis and Design Documents" copyright 2003, 10 pages.

US Non-Final Office Action for U.S. Appl. No. 11/951,973, mailed Jan. 19, 2011.

US Non-Final Office Action for U.S. Appl. No. 12/145,536, mailed Nov. 18, 2010.

US Notice of Allowance for U.S. Appl. No. 11/938,082, mailed Jan. 4, 2011.

US Final Office Action for U.S. Appl. No. 12/145,536 mailed Apr. 26, 2011, 34 pages.

US Non-Final Office Action for U.S. Appl. No. 12/111,174, mailed Jun. 8, 2011, 35 pages.

US Notice of Allowance for U.S. Appl. No. 11/938,082, mailed Jan. 4, 2011, 23 pages.

"Comprehensive S1000D™ Project Setup and Management Support"—Inmedius, Inc. copyright 2005, 6 pages.

"Team Development with Zend Studio for Eclipse"—White Paper, Zend Corporation copyright 2008, 17 pages.

Appleton, Brad, "ClearView: Associating Attributes and Notes With a View"—Sep. 1996, 16 pages.

Bellagio et al.; Software Configuration Management Strategies and IBM Reational ClearCase A Practical Introduction, May 23, 2005, 6 pages.

Byfield, Bruce, "Ooo Off the Wall: That's Your Version—Document Control in Ooo Writer"—Mar. 7, 2006, 6 pages.

Chinese Office Action in CN Application No. 2008-80115943.1 mailed Oct. 25, 2011, 13 pages.

European Supplemental Search Report in EP Application No. 0973950.8 mailed Nov. 9, 2011, 10 pages.

Final Office Action in U.S. Appl. No. 12/276,874 mailed Aug. 3, 2011, 15 pages.

International Search Report and Written Opinion for PCT/US2009/037920 mailed Nov. 30, 2009, 11 pages.

International Search Report and Written Opinion for PCT/US2009/045558 mailed Nov. 30, 2009, 11 pages.

International Search Report and Written Opinion for PCT/US2009/062364 mailed May 31, 2010, 11 pages.

Notice of Allowance in U.S. Appl. No. 11/951,973 mailed Jun. 21, 2011, 12 pages.

Notice of Allowance in U.S. Appl. No. 12/117,025 mailed Jul. 21, 2011, 12 pages.

Notice of Allowance in U.S. Appl. No. 12/117,025 mailed Sep. 15, 2011, 11 pages.

Office Action in U.S. Appl. No. 11/957,010 mailed Aug. 17, 2011, 33 pages.

Office Action in U.S. Appl. No. 12/111,174 mailed Nov. 21, 2011, 22 pages.

Office Action in U.S. Appl. No. 12/117,040 mailed Oct. 4, 2011, 35 pages.

Office Action in U.S. Appl. No. 12/276,874 mailed Feb. 22, 2011, 25 pages.

Office Action in U.S. Appl. No. 12/145,536 mailed Aug. 1, 2011, 37 pages.

Office Action in U.S. Appl. No. 12/276,874 mailed Aug. 3, 2011, 15 pages.

Office Action in U.S. Appl. No. 12/276,874 mailed Oct. 26, 2011, 18 pages.

Samiei et al.; "EzMail: Using Information Visualization Techniques to Help Manage Email" 2007, 6 pages.

Venolia et al., "Understanding Sequence and Reply Relationships Within Email Conversations: A Mixed-Model Visualization"—ACM copyright 2003, 8 pages.

Wilde, Erik, "Multi-User Multimedia Editing with the MultimETH System,"—accessed at http://dret.net/netdret/docs/wilde-tikrep18.pdf; at least as early as Oct. 10, 2007, 9 pages.

Williams, Tim; "Version Control on the Cheap: A User-Friendly, Cost-Effective Revision Control System for SAS"—Paper AD13, PRA International, Jan. 20, 2004, 10 pages.

Chinese First Office Action in Application No. 200880119647.9 mailed Nov. 24, 2011, 7 pages.

Office Action in U.S. Appl. No. 13/079,605 mailed Dec. 5, 2011, 43 pages.

Notice of Allowance in U.S. Appl. No. 12/117,025 mailed Dec. 28, 2011, 14 pages.

Final Office Action in U.S. Appl. No. 11/957,010 mailed Jan. 27, 2012, 36 pages.
"Perforce Software Delivers Improved Performance to Its Fast Software Configuration Management System," Perforce Software, Jul. 9, 2007, 2 pages.
Badouel, Eric et al.; "Merging Hierarchically-Structured Documents in Workflow Systems", Electronic Notes in Theoretical Computer Science 203, (2008), pp. 3-24.
Chinese 1st office Action in Application 200880121295.0, mailed Jan. 18, 2012, 6 pages.
Chinese 1st Office Action in Application 200980115758.7, mailed Mar. 28, 2012, 10 pages.
Dekeyser, Stijin et al.; "Path Locks for XML Document Collaboration", University of Antwerp, Dec. 12, 2002, pp. 105-114.
Ellis et al.; "Groupware—Some Issues and Experiences", vol. 34, No. 1, Jan. 1, 1991, pp. 38-58.
European Extended Search Report in EP Application 09767155.6, mailed Mar. 26, 2012, 10 pages.
Feise, Joachim; "A Survey of Distributed Hypermedia Systems," ISR Institute for Software Research, University of California, Irvine, Apr. 2005, 39 pages.
Mendoza et al.; "A Flexible Distribution Service for a Co-authoring Environment on the Web," IEEE Computer Society, Proceedings of Sixth Mexican International Conference on Computer Science (ENC '05) © 2005, 8 pages.
PCT International Search Report and Written Opinion in Application PCT/US2010/032309, mailed Dec. 1, 2010, 9 pages.
Shepler et al.; "Network File 1-15 Systems (NFS)," Version 4, Apr. 1, 2003, retrieved from http://rsync.tools.ietf.org/html/rfc3530 on Mar. 7, 2012, 275 pages.
Shiro, Sakata; "Development and Evaluation on an in-house multimedia desktop conference system", Apr. 1990, IEEE Journal on selected areas in communications, vol. 8, 8 pages.
Taiwan Search Report and Office Action in Application 97142418, mailed Feb. 21, 2012, 13 pages.
Tanebaum, Andrew S.; "Moderne Betriebssysteme", 2003, Pearson, pp. 786-787.
U.S. Appl. No. 12/111,174, Notice of Allowance mailed Apr. 12, 2012, 11 pages.
U.S. Appl. No. 12/117,040, Notice of Allowance mailed Mar. 29, 2012, 11 pages.
U.S. Appl. No. 12/145,536, Office Action mailed Mar. 12, 2012, 52 pages.
U.S. Appl. No. 12/276,874, Office Action mailed Apr. 26, 2012, 20 pages.
U.S. Appl. No. 12/432,817, Notice of Allowance mailed May 2, 2012, 6 pages.
U.S. Appl. No. 12/432,817, Office Action mailed Jan. 25, 2012, 27 pages.
U.S. Appl. No. 12/432,817, Office Action mailed Sep. 12, 2011, 25 pages.
U.S. Appl. No. 13/079,605, Notice of Allowance mailed Apr. 20, 2012, 9 pages.
"Technical Overview"—Apache CouchDB, The Apache Software Foundation, © 2008, 7 pages.
Australian Office Action in Application 2008324973, mailed Jul. 4, 2012, 3 pgs.
Chinese 1st Office Action in Application 201080019470.2, mailed Aug. 31, 2012, 7 pgs.
Notice of Allowance mailed Jun. 28, 2012, in co-pending U.S. Appl. No. 13/079,605, 9 pgs.
Notice of Allowance mailed Jun. 21, 2012, in co-pending U.S. Appl. No. 12/117,040, 9 pgs.
Notice of Allowance mailed Aug. 20, 2012, in co-pending U.S. Appl. No. 12/117,040, 14 pgs.
Notice of Allowance mailed Aug. 6, 2012, in co-pending U.S. Appl. No. 12/432,817, 5 pgs.
Notice of Allowance mailed Aug. 29, 2012, in co-pending U.S. Appl. No. 12/111,174, 27 pgs.

* cited by examiner

FIG. 8

| ID 812 | DATA 814 | TAG 816 |
|---|---|---|
| ID 1 | Data Blob 1 | Tag 1 |
| ID 2 | Data Blob 2 | Tag 2 |
| ID 3 | Data Blob 3 | Tag 3 |
| ID 4 | Data Blob 4 | Tag 4 |

800

810

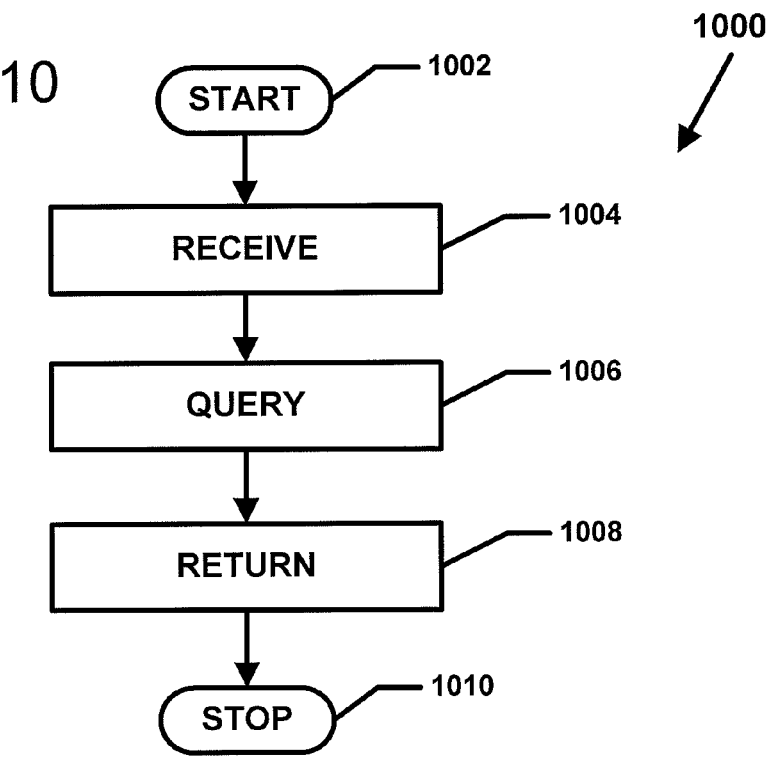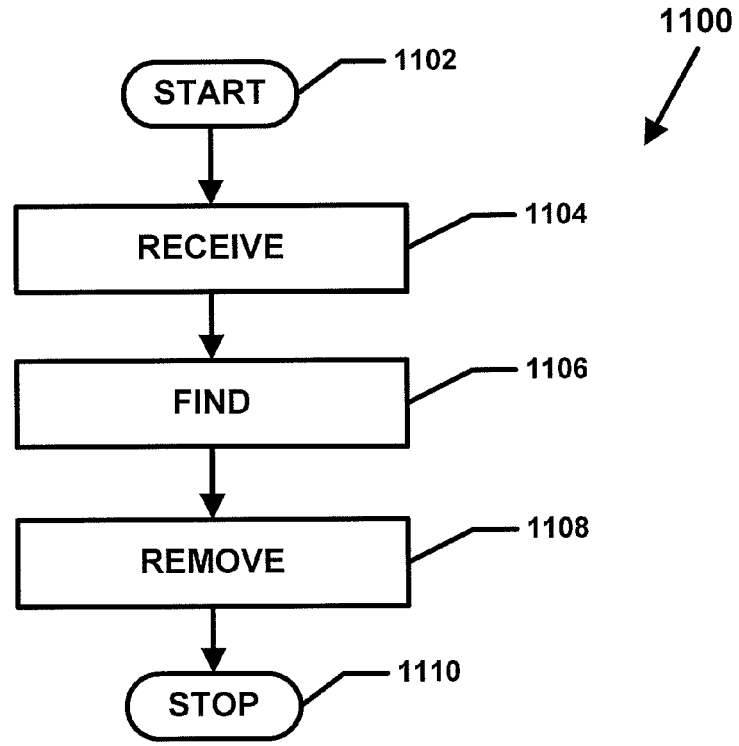

DATA STORAGE FOR FILE UPDATES

BACKGROUND

Data files (e.g., word processing documents, presentation documents, spreadsheet documents, pictures or other images, sound files, software applications, executable code, etc.) may be stored in persistent storage locations on storage devices in particular file formats. Accessing one of these data files typically includes retrieval of the entire data file from the persistent storage location.

When the data files are stored in the persistent storage location, the storage device may perform a number of pre-storage processes before writing the data files to the storage location. For example, the storage device may perform security checks on the data files, such as searching for viruses and/or corrupted files. The storage device also may perform property discovery on the data files. The aggregation of one or more of these pre-storage processes may be referred to as a save pipeline. Implementing the save pipeline may be relatively expensive in terms of time and/or resources.

Multiple users may wish to edit a document stored in persistent storage. For example, users may wish to collaboratively author the document. Such multi-user authoring may cause problems in scalability and/or performance. For example, storing changes from multiple users may require a potentially unbounded amount of computation by the save pipeline (e.g., the save pipeline may be implemented for each set of changes for each user). Such a drain on resources may cripple the storage device's ability to handle very frequent file update requests.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

File updates for a data file may be stored temporarily in a blob storage before being committed to persistent storage. According to aspects, expensive pre-storage processing is performed after coalescing the file updates with the data file to form an updated data file to be committed to the persistent storage. According to other aspects, the file updates are accessible individually or as part of the data file before being committed. In one embodiment, the file updates include incremental updates received from one or more applications. According to other aspects, portions of the data file may be incrementally accessible after being committed to persistent storage.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 8 is a schematic block diagram of another example blob storage configured in accordance with the principles of the present disclosure;

FIGS. 9-11 are flowcharts illustrating example access processes with which an access module may write to, read from, or delete entries from a blob database in accordance with the principles of the present disclosure;

DETAILED DESCRIPTION

Figure 1:
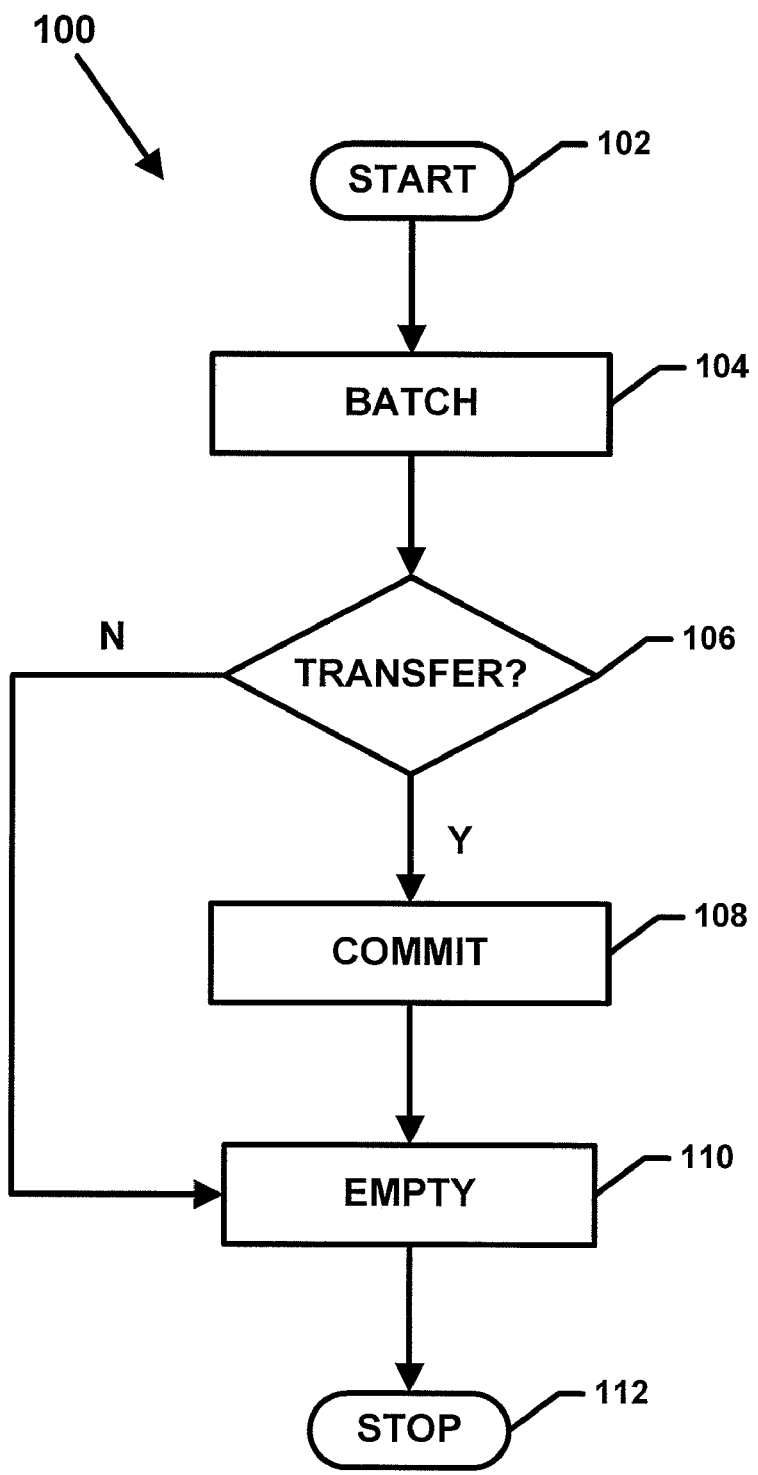
FIG. 1 is a flowchart illustrating an operational flow for an example storage process by which data may be stored on a storage device in accordance with the principles of the present disclosure.

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the invention is defined by the appended claims and their equivalents.

Embodiments of the present disclosure provide an environment in which a storage device, such as a server computing device, may provide efficient processing and storage of data files. Data storage consistent with the principles of the present disclosure is generally provided in a two-stage process. Firstly, data is stored temporarily in a "hot box" or blob storage location. Secondly, some or all of the data within the blob storage location may be transferred to a "cold" or persistent storage location.

As the term is used herein, the hot box or blob storage location refers to a location (e.g., a sandbox) in which data and/or metadata associated with a data file may be stored temporarily as a blob data (e.g., an arbitrary length binary string of data). While stored in the blob storage location, the blob data may be referred to as "hot" data. In one embodiment, the hot data being stored in the blob storage location may include an entire data file or one or more portions (e.g., content and/or metadata) of the data file. In another embodiment, the hot data may include temporary data not intended for persistent storage (e.g., thumbnail previews of the data file).

As the term is used herein, the cold storage location refers to a persistent (i.e., as opposed to temporary) data storage location. Typically, any expensive (e.g., in time, in resources, etc.) data processing is performed only when the hot data is being committed to the cold storage location. Transferring the hot data to the cold storage location may include arranging or integrating the hot data into a data file format recognizable to the storage device.

According to aspects of the disclosure, the blob storage location provides an abstract data model that may be built onto existing infrastructure of the storage device to increase data storage efficiency. For example, appropriate software, such as a handler application program interface (API) disclosed in greater detail herein, may be added to an existing storage device, such as a server computer, to intercept data to be stored persistently, to gather the data in the blob storage location until a predetermined condition is satisfied, and subsequently to transfer the data from the blob storage location to a preexisting cold storage location (e.g., using a preexisting save pipeline).

According to other aspects of the disclosure, the blob storage location may enable incremental storage of and access to data files stored on the storage device. The blob storage location can store data as unformatted blob data. Accordingly, the data being stored in the blob storage location need not conform to an underlying file format of the cold storage location until committed to the cold storage location. Because the blob storage location is agnostic of the underlying file format of the data being stored, portions of or changes to a data file may be stored in and accessed from the blob storage location instead of storing and accessing the entire data file. For example, in one embodiment, one or more data units (e.g., paragraphs, pictures, text blocks, objects, etc.) of a data file may be stored in the blob storage location. In another embodiment, metadata indicating differences between two versions of a file may be stored in the blob storage location.

The data stored in the blob storage location may be coalesced into a proper file format if and when appropriate (e.g., when being committed to the cold storage location). For example, the data may be processed by a file format specific algorithm to arrange the data into an appropriate file format. In one embodiment, after being coalesced, the data may be accessed as a single data file. In another embodiment, additional software may be provided to enable incremental access to the data files stored in the cold storage location as disclosed in greater detail herein.

Referring now to the drawings, FIG. 1 is a flowchart illustrating an operational flow for an example storage process 100 by which data may be stored on a storage device. The storage process 100 initializes and begins at a start module 102 and proceeds to a batch operation 104. The batch operation 104 stores data in a temporary blob storage location. For example, the batch operation 104 may store the data in a blob storage database on the storage device. In one embodiment, the batch operation 104 performs minimal processing of the data before storing the data in the temporary blob storage location. In general, the batch operation 104 may store partial or complete data files independent of any underlying file format.

A transfer determination module 106 determines whether some or all of the data contained in the blob storage location should be transferred to a more persistent storage location or arranged in a more persistent storage format. For example, the transfer determination module 106 may determine whether the data stored in the temporary blob storage location includes data intended to replace or supplement data stored in a cold storage location.

If the transfer determination module 106 determines none of the data should be transferred, then the storage process 100 proceeds to an empty operation 110, which removes data from the temporary blob storage location without first committing the data to a cold storage location. For example, the empty operation 110 may delete metadata (e.g., a thumbnail image) associated temporarily with the file. The storage process 100 completes and ends at a stop module 112.

If the transfer determination module 106 determines at least some of the data should be stored in a more persistent manner, however, then a commit operation 108 transfers at least some of the data from the blob storage location to a cold storage location. For example, the commit operation 108 may store the data from the blob storage location in a cold storage database. In one embodiment, the commit operation 108 performs data processing (e.g., anti-virus checking, property discovery, or any other expensive data processing operation) on the data before storing the data at the cold storage location.

In one embodiment, the commit operation 108 stores only data obtained from the blob storage location into the cold storage location. In another embodiment, the commit operation 108 merges newly received data with data previously stored in the blob storage location (e.g., by one or more executions of the batch operation 104) before storing the merged data in the cold storage location. In another embodiment, the commit operation 108 merges data stored at the blob storage location with data already stored in the cold storage location.

The empty operation 110 removes data from the temporary blob storage location. In one embodiment, the empty operation 110 removes all data contained in the temporary blob storage location. In another embodiment, the empty operation 110 may remove a set or range of data. For example, the empty operation 110 may remove any data saved in the cold storage location. The storage process 100 completes and ends at a stop module 112 as described above.

Figure 2:
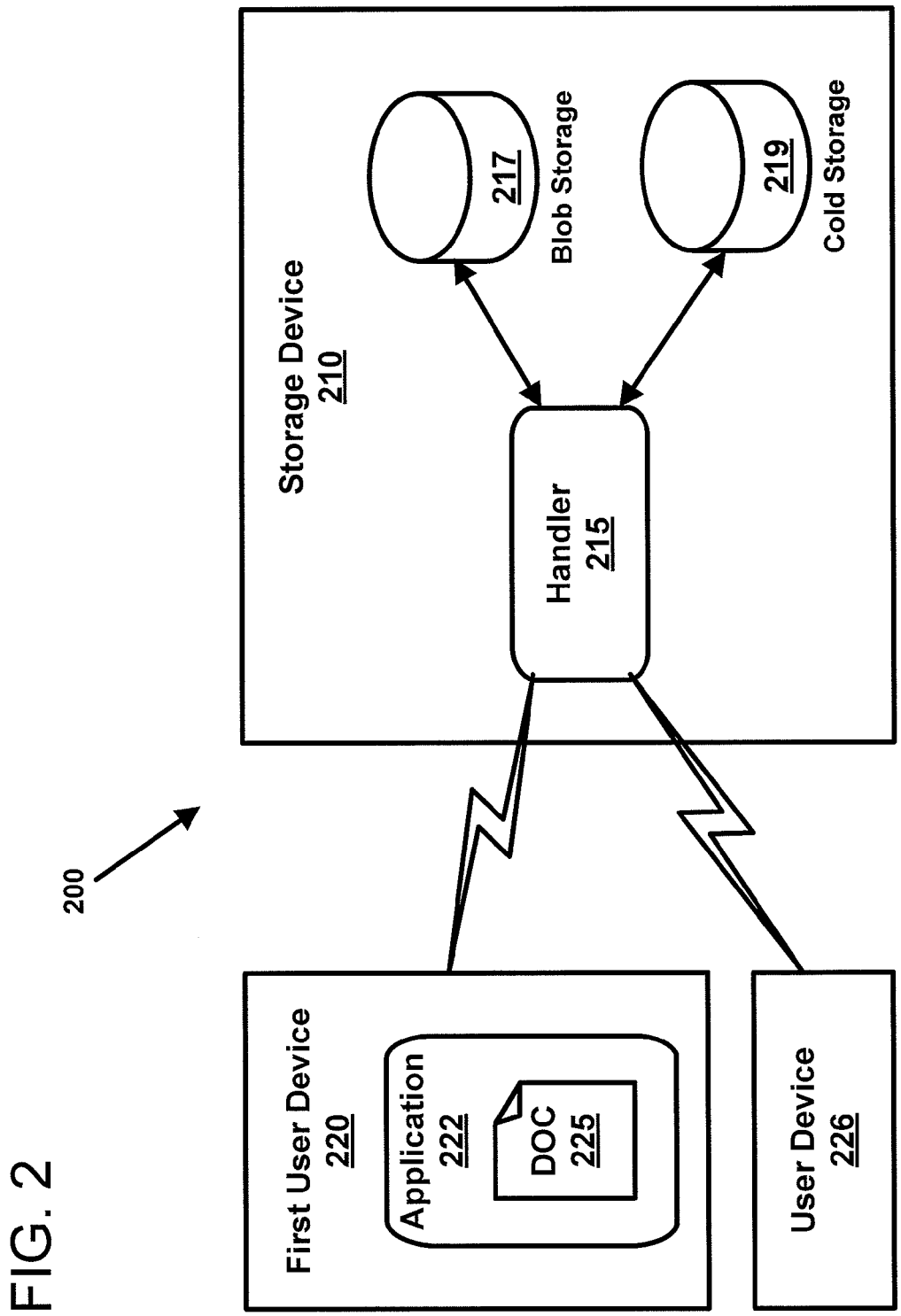
FIG. 2 is a schematic block diagram of an example data storage system including a handler configured to perform the data storage process described above in FIG. 1 in accordance with the principles of the present disclosure.

FIG. 2 is a schematic block diagram of an example data storage system 200 configured to perform the storage process 100 described above with reference to FIG. 1. The storage system 200 includes a storage device 210 that is generally configured to implement a data processing and storage environment. In one embodiment, the storage device 210 includes a server computing device. In other embodiments, however, the storage device 210 may include multiple storage devices communicatively coupled together (e.g., via a network such as an intranet, a LAN, a WAN, or the Internet).

The storage device 210 is communicatively coupled to at least a first cold storage 219 and at least a first blob storage 217 associated with the first cold storage 219. In one embodiment, the aggregation of data stored in the first blob storage 217 and the first cold storage 219 represents the current state of a document stored on the storage device 210. In an embodiment, additional blob storages may be associated with the first cold storage 219. In another embodiment, the first blob storage 217 may be associated with additional cold storages.

In general, the first blob storage 217 and the first cold storage 219 each may be maintained on the storage device 210 or at any desired location that is communicatively coupled to the storage device 210. For example, the blob storage 217 may be maintained locally on the storage device 210 and the cold storage 219 may be maintained at a remote location communicatively coupled to the storage device 210. In one embodiment, one or more characteristics of the blob storage 217 may be optimized for speed (e.g., length of time to store and/or access the data). In one embodiment, one or more characteristics of the cold storage 219 may be optimized for long term storage (e.g., to emphasize reliability over speed).

The storage device 210 (e.g., a server computing device) is configured to interact with at least a first user device 220 (e.g., a client computing device). For example, the storage device 210 may be configured to receive an access request from a first user device 220 to store data from the first user device 220 on the storage device 210. In one embodiment, the first user device 220 also may retrieve data from the storage device 210. As shown in FIG. 2, the storage system 200 may interact with multiple user devices (e.g., see user devices 220, 226) configured to access the storage device 210.

The first user device 220 of FIG. 2 may include a computing device (e.g., a personal computer, a server computer, a notebook computer, a PDA, a Smartphone, or any other such computing device). In general, the first user device 220 is configured to execute one or more applications 222 to author documents (e.g., DOC 225) or other data files that may be stored on the storage device 210. One non-limiting example of an authoring application that may be executed on the first user device 220 is MICROSOFT® OFFICE WORD authoring software from MICROSOFT CORPORATION of Redmond, Wash. Other non-limiting examples of authoring applications include POWERPOINT® presentation software and VISIO® drawing and diagramming software, both also from MICROSOFT CORPORATION of Redmond, Wash.

In general, the storage device 210 includes a handler 215 that is configured to communicate with applications executing on the storage device 210, applications executing on the user device 220, or with any other applications communicatively coupled to the storage device 210. In one embodiment, the handler 215 does not determine a file format of the data received from or sent to the applications. In such an embodiment, the handler 215 implements processes that execute independently of an underlying file format of the data.

The handler 215 of the storage device 210 may receive data from the application 222 of the first user device 220 and store the data in the first blob storage 217. For example, the handler 215 periodically may receive updates to the data file DOC 225 (e.g., incremental changes, new versions of the document, etc.) being authored by the application 222 and may store these updates in the first blob storage 217.

In some embodiments, the handler 215 may receive updates for the same data file from multiple user devices. For example, multiple users may edit a data file simultaneously and attempt to share changes. If two or more of the received updates are associated with the same data file, then the handler 215 may store these received updates in the same blob storage location (e.g., the first blob storage 217). Updates relating to different data files, however, are typically stored in different blob storages (e.g., different database tables within one or more blob storage locations).

Subsequently, the handler 215 may transfer the updates from the first blob storage 217 to the first cold storage 219. Embodiments of the handler 215 may coalesce the data stored in the first blob storage 217 with cold data already stored in first cold storage 219. In one embodiment, coalescing the data may include arranging the data according to a particular file format. In such an embodiment, the handler 215 implements processes that execute in accordance with an underlying file format of the data being processed. Embodiments of the handler 215 may refrain from executing the pre-storage processes of the save pipeline on the data being stored into the first blob storage 217. Rather, the pre-storage processes may be performed on the coalesced data when the coalesced data is saved in the first cold storage 219.

The handler 215 also may receive access requests for data from applications communicatively coupled to the storage device 210 (e.g., application 222 on the first user device 220). Such applications may be agnostic of the architecture and storage environment of the storage device 210. Accordingly, the requesting application need not know how the requested data is stored on the storage device (e.g., in the first blob storage 217 or in the first cold storage 219). Rather, the handler 215 of the storage device 210 determines where the requested data is stored, retrieves the requested data from the appropriate storage 217, 219, and sends the requested data to the requesting application. Accordingly, in one embodiment, a second application (not shown) may request and receive access to data provided by the application 222 and stored in the first blob storage 217.

Figure 3:
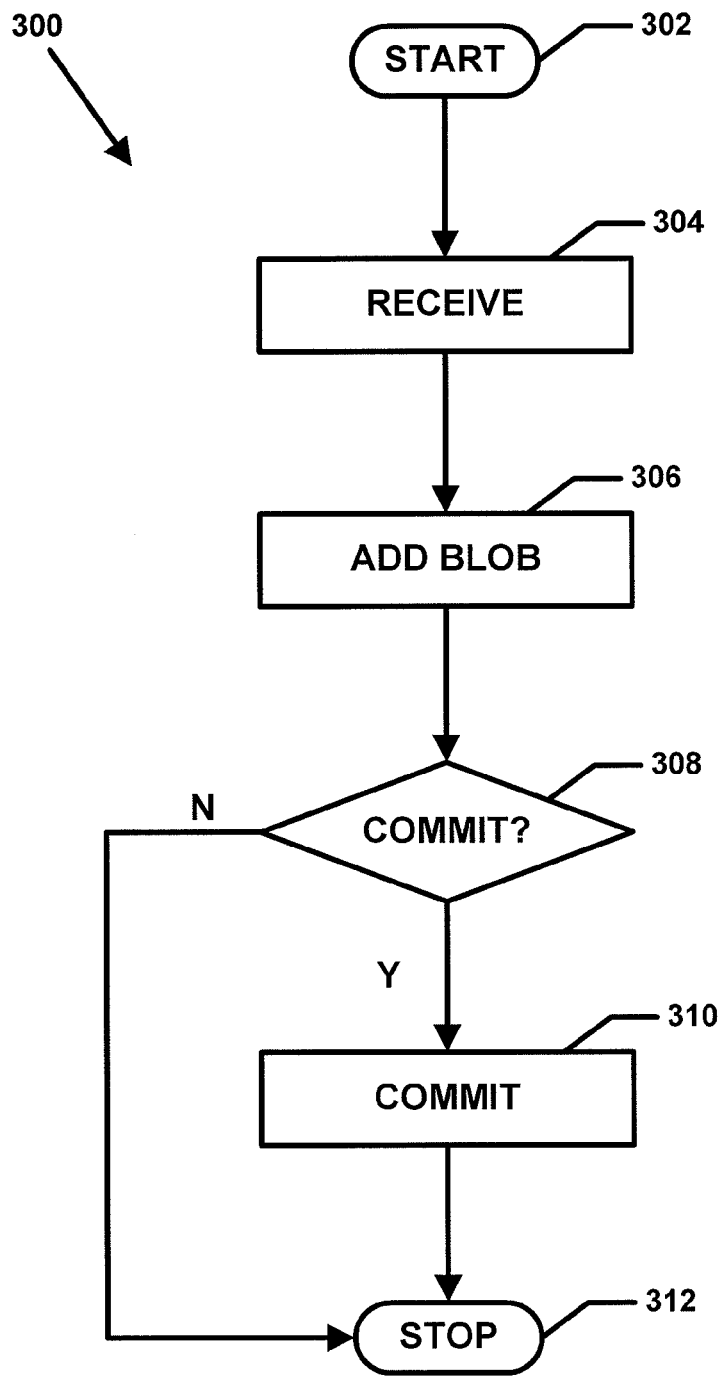
FIG. 3 is a flowchart illustrating an operational flow for an example handling process that may be performed by the handler of the storage device of FIG. 2 in accordance with the principles of the present disclosure.

FIG. 3 is a flowchart illustrating an operational flow for an example handling process 300 that may be performed by the handler 215 of the storage device 210. The handling process 300 initializes and begins at a start module 302 and proceeds to a receive operation 304. The receive operation 304 obtains data and instructions to store the data at a storage location, such as the storage device 210. In one embodiment, the receive operation 304 may receive data provided by one of the user devices 220. For example, the receive operation 304 may receive updates for a document being authored by an application 222 on the user device 220.

An add operation 306 accesses a blob storage, such as the first blob storage 217 of FIG. 2, and stores the received data to the temporary blob storage. For example, the add operation 306 may place the received data into a blob storage database maintained at the storage location. In one embodiment, the add operation 306 performs minimal or no processing on the received data before adding the received data to the blob storage. In general, data stored in the blob storage is accessible (e.g., read and/or write access) to applications communicatively coupled to the storage location.

In some embodiments, the add operation 306 may read data from the blob storage or a cold storage before adding data to the blob storage. For example, in one embodiment, the add operation 306 may validate the data being added to the blob store is consistent with data stored in the cold store. In another embodiment, the add operation 306 also may be able to use some data from the cold storage to optimize the storage of the new data in the blob storage (e.g., such that subsequent reads are faster).

A determination module 308 determines whether to commit the data stored at the blob storage to a cold storage. In some embodiments, the determination module 308 checks whether instructions to commit the changes have been provided (e.g., by the application 222 of the first user device 220, by the handler 215, etc.). For example, a user of the user device 222 may trigger a transfer of data from the blob storage to the cold storage by selecting a "save" option when editing a data file. In other embodiments, however, the determination module 308 may check other conditions to determine whether to commit the data. For example, the determination module 308 may elect to commit the blob storage data when the blob storage reaches a predetermined size or when a predetermined time limit elapses.

If the determination module 308 determines the data in the blob storage should not yet be committed to the cold storage, then the handling process 300 may complete and end at a stop module 312. If the determination module 308 determines the data in blob storage should be committed, however, then the handling process 300 may proceed to a commit operation 310. The commit operation 310 transfers the data previously stored in the blob storage into the cold storage.

In one embodiment, the commit operation 310 stores all data contained in the blob storage to the cold storage. In another embodiment, the commit operation 310 only commits to the cold storage a portion of the data contained in the blob storage (e.g., all data added before or after a given date and time, all data provided by a particular user application, etc.). The handling process 300 completes and ends at the stop module 312 as described above.

Figure 4:
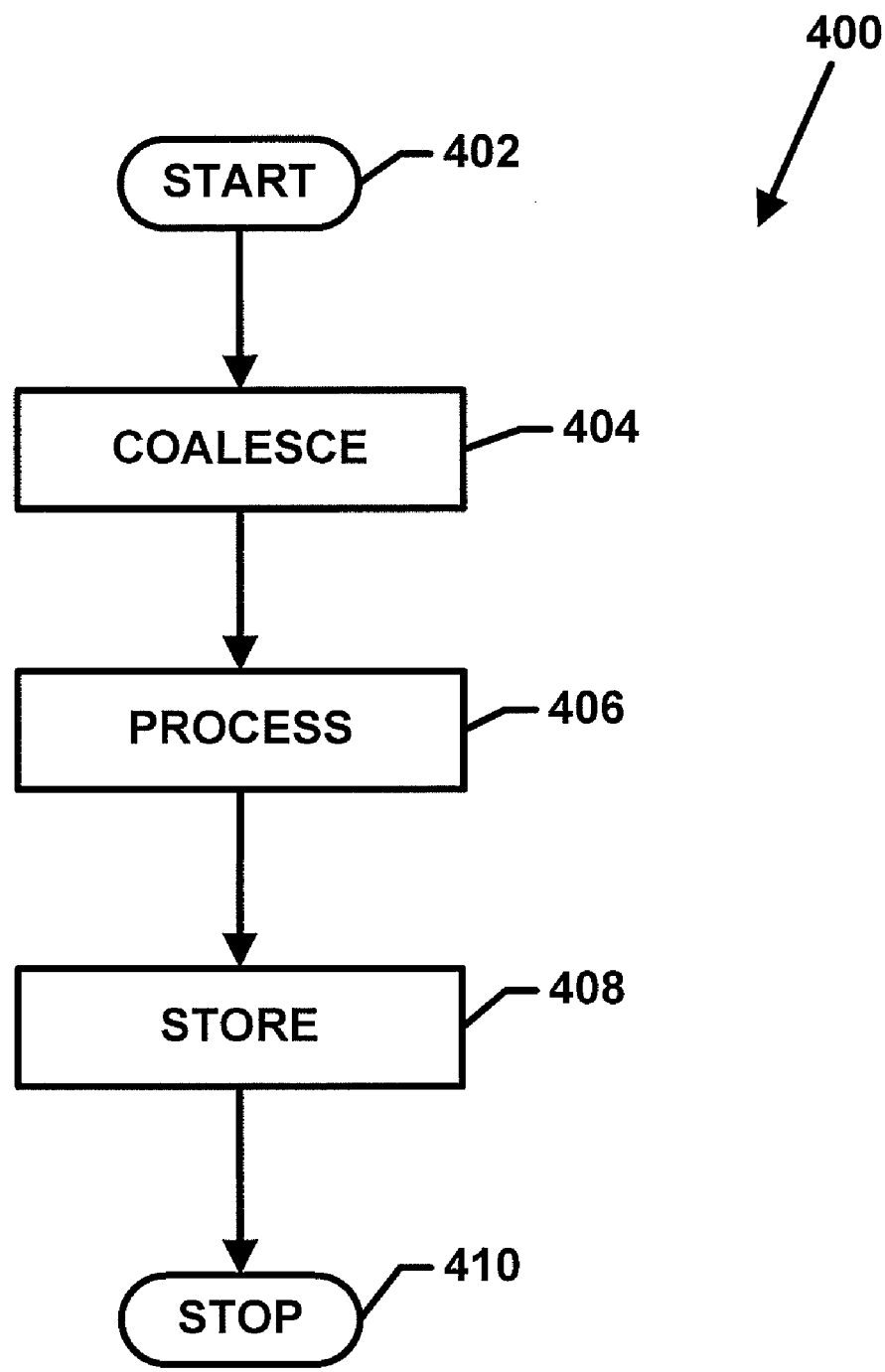
FIG. 4 is a flowchart illustrating an operational flow for an example commit process according to which the commit operation of the handling process of FIG. 3 may be executed in accordance with the principles of the present disclosure.

FIG. 4 is a flowchart illustrating an operational flow for an example commit process 400 according to which the commit operation 310 of handling process 300 may be executed. The commit process 400 initializes and begins at a start module 402 and proceeds to a coalesce operation 404.

Coalesce operation 404 integrates the data that has been stored in the blob storage. In one embodiment, the coalesce operation 404 may integrate the data stored in the blob storage with any data stored in the cold storage. In one embodiment, the coalesce operation 404 retrieves the entire data file stored in the cold storage. In another embodiment, however, the coalesce operation 404 retrieves one or more relevant portions of the data file to be coalesced with the data from the blob storage. For example, the coalesce operation 404 may accesses the data file in the cold storage incrementally using file format metadata as will be discussed in greater detail herein.

Optionally, the coalesce operation 404 may determine properties of the blob storage data, such as the type of data, the file format of the data, or the relationship between the data stored in the blob storage and the data stored in the cold storage. The data may be integrated differently depending on the determined relationship. For example, in one embodiment, the coalesce operation 404 may determine data obtained from the blob storage includes a new data file to replace the data file stored in the cold storage. In another embodiment, the coalesce operation 404 may determine the data obtained from the blob storage includes a series of incremental updates to be instantiated into the data file stored in the cold storage as will be discussed in greater details herein. In another embodiment, the coalesce operation 404 may determine the data obtained from the blob storage includes metadata to be associated with the data file stored in the cold storage (e.g., via a metadata table auxiliary to the file).

A process operation 406 analyzes the coalesced data and performs any desired type of data processing before the coalesced data in transferred to the cold storage. For example, in one embodiment, the process operation 406 may perform security checks (e.g., may check the coalesced data from viruses, spy-ware, ad-ware, and/or other issues). In another embodiment, the process operation 406 performs property discovery on the coalesced data. In other embodiments, the process operation 406 may perform hyperlink fix-up, firing events, triggering of workflow, and other such processes.

A store operation 408 saves the coalesced and processed data into a cold storage, such as cold storage 219 (see FIG. 2). After being added to cold storage, the data is referred to as cold data. In an embodiment, the store operation 408 replaces the data file previously stored in the cold storage with the newly coalesced and processed data. In another embodiment, the store operation 408 may overwrite portions of the previously stored data file to update portions of the data file. For example, if the coalesce operation 404 determines the data obtained from the blob storage includes incremental updates to the data file stored in the cold storage, then the store operation 408 may access only relevant portions of the data file in the cold storage (e.g., via file format metadata as discussed in greater detail herein) and overwrite only those relevant portions. The commit process 400 completes and ends at a stop module 410.

Figure 5:
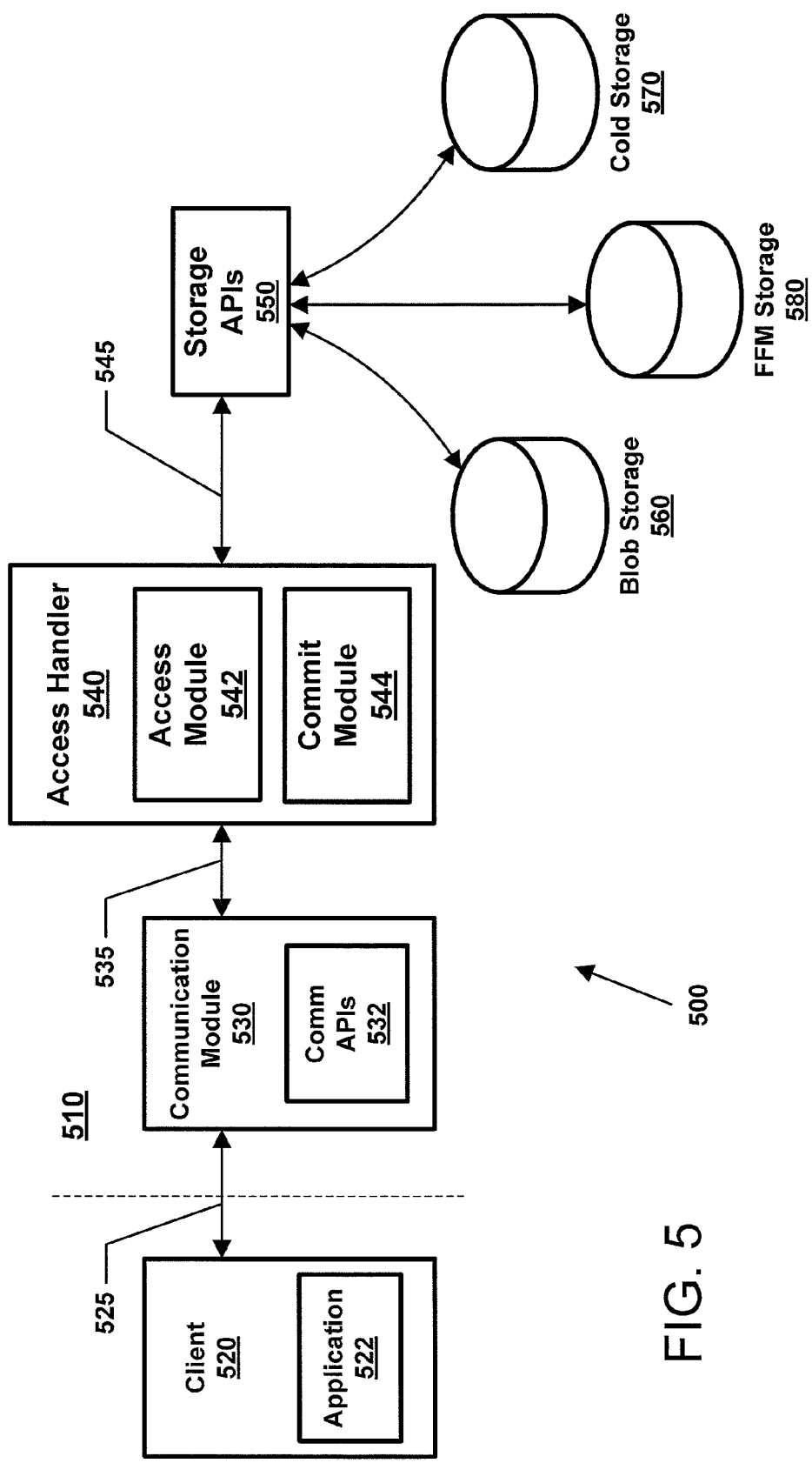
FIG. 5 is a schematic block diagram of a data processing and storage system having features that are examples of inventive aspects in accordance with the principles of the present disclosure.

FIG. 5 is a schematic block diagram of a data processing and storage system 500 having features that are examples of inventive aspects in accordance with the principles of the present disclosure. In the example shown, the data processing and storage system 500 is provided on a server computing device 510. In other embodiments, however, the data processing and storage system 500 may be provided on any suitable computing or data storage device.

The data processing and storage system 500 includes a communication module 530, an access handler 540, a blob storage 560, and a cold storage 570. In general, the communication module 530 manages communication (see arrows 525 and 535) between the access handler 540 and one or more applications or processes (e.g., an application 522 on a computing device 520) providing data to be stored or requesting stored data. The access handler 540 stores data to and retrieves data from the blob storage 560 and the cold storage 570.

In one embodiment, the applications providing and requesting data are implemented on one or more remote computing devices coupled to the server 510. In another embodiment, however, the communication module 530 is configured to communicate with an application executing on the server 510 to send and receive data updates. For ease in understanding, the remainder of this document will assume any application providing data to be stored or requesting stored data is executing on a separate computing device from the storage device.

In general, the communication module 530 communicates with the applications providing or requesting data using one or more communication protocols. In one embodiment, the communication module 530 may include one or more communication APIs 532. The applications may be agnostic to the architecture and processes of the server 510 as long as the applications are familiar with the communication protocol used by the communication module 530. Similarly, the server 510 may be agnostic to the architecture of any computing devices communicatively coupled to the server 510 (e.g., the computing device 520) and the processes of any applications executing thereon.

In the example shown in FIG. 5, the communication module 530 may receive data from an application 522 on a client computing device 520 for storage. For example, in one embodiment, the communication module 530 may receive incremental edits to content and/or metadata of a document being edited by the application 522 for integration into a master copy of the document (not shown) stored on the server 510. In other embodiments, the communication module 530 may receive new data files to be stored on the server 510 or modified data files to replace data files previously stored on the server 510. The communication module 530 sends the received data to the access handler 540 for storage.

The communication module 530 also may receive requests from the application 522 to access documents (not shown) stored on the server 510. In such embodiments, the communication module 530 forwards the requests to the access handler 540, obtains the requested data from the access handler 540, and transmits the requested data back to the client computing device 520. In one embodiment, the communication module 530 provides the requested data to the application 522 client computing device 520 without determining an underlying file format of the data.

In general, the access handler 540 includes an access module 542 that manages access to the blob storage 560 and the cold storage 570. In one embodiment, the access module 542 may include one or more access APIs (not shown). In one embodiment, the access module 542 may abstract how data is stored and accessed on the server 510 by accessing the blob storage 560 and cold storage 570 using preexisting storage APIs 550 provided on the server 510 (see arrow 545). The storage APIs 550 each may be tailored to the architecture of the server 510 to provide efficient read and/or write access to server memory implementing the blob and cold storages 560, 570, respectively.

In one embodiment, different storage APIs 550 may be provided for performing the same basic function (e.g., reading from the blob storage 560, writing to the blob storage 560, or reading from the cold storage 570) with different types of data (e.g., data having different file formats). The access module 542 may select which preexisting storage APIs 550 to utilize based on the type of data being stored or accessed. In one embodiment, the access module 542 determines the type of data being stored based on information provided by the providing and/or requesting application via the communication module 530.

The access handler 540 also includes a commit module 544 that transitions that data from the blob storage 560 to the cold storage 570. In general, the commit module 544 retrieves data currently stored in the blob storage 560, commits at least some of the data to the cold storage 570 through a save pipeline, and clears the committed data from the blob storage 560. In one embodiment, the commit module 544 may include one or more commit APIs (not shown) for committing different types and/or formats of data to the cold storage 570.

In one embodiment, the client computing device 520 may trigger the commit module 544 to begin the commit process. For example, in FIG. 5, the application 522 on the user device 520 may provide instructions to commit data in the blob storage 560 when a user of the application 522 instructs the application 522 to save and share the data with the server 510 (e.g., for instantiation into a master copy of the data). In another embodiment, a second application (not shown) may trigger the commit process. In such an embodiment, the second client may trigger the transfer to cold storage 570 of the data provided by the first application 522, which was previously stored in the blob storage 560, as well as the data provided by the second application.

In other embodiments, however, the commit module 544 may trigger the commit process without interaction with a user application. For example, in one embodiment, the commit module 544 may provide instructions to commit when the commit module 544 determines the blob storage 560 has reached a predetermined size or has filled a predetermined percent of its capacity. In another embodiment, the commit module 544 may provide instructions to commit when the commit module 544 determines a predetermined length of time has elapsed since a previous implementation of the commit process. In other embodiments, the commit module 544 may trigger the commit process based on other such triggering criteria.

In some embodiments, the data processing and storage system 500 also may include file format metadata (FFM) storage 580 in which file format metadata associated with a particular file may be stored. In general, file format metadata enables the access handler 540 or other applications on the storage device 510 to access a data file stored in the cold storage 570 incrementally based on the underlying file format of the stored data file. For example, the file format metadata may include an index representing a general file structure indicating where data can be found within the stored data file. Accordingly, the file format metadata may enable the access handler 540 to retrieve one or more requested data units (e.g., a paragraph) of a data file (e.g., a word processing document) instead of retrieving the entire data file.

Incremental access may enhance the efficiency with which data is retrieved from the cold store 570 and may minimize the resources utilized in the retrieval. For example, in one embodiment, the file format metadata may be stored on the storage device 510 and the cold storage 570 may be maintained at a remote location (not shown). In such an embodiment, accessing the file format metadata locally, determining a relevant section of the data file, and requesting the relevant section from the remote location may be cheaper (e.g., in terms of processing time and/or resources) than retrieving the entire data file from the remote location. In other embodiments, however, the file format metadata may be stored as a data file in the cold storage 570 or as data in the blob storage 560. Updates to the file format metadata also may be stored as data in the blob storage 560.

File format metadata may be generated or updated by the access handler 540 or other module capable of identifying the structure and format of data when data from the blob storage 560 is committed to the cold storage 570. In one embodiment, the file format metadata includes indices and offsets which allow the access handler 540 to perform the incremental access of the data file in the cold storage 570. For example, the access handler 540 may parse the data file to identify relevant data units within the data file and to determine the offset location of the data units for storage as metadata offsets. In one embodiment, the file format metadata is stored as a database.

As noted above, a data processing and storage environment having features that are examples of inventive aspects in accordance with the principles of the disclosure can be implemented on a computing device (e.g., a server computer, a personal computer, a notebook computer, a PDA, a Smartphone, or any other such storage device). A non-limiting embodiment of a storage system 600 configured to implement the data processing and storage environment 500 of FIG. 5 is described herein with reference to FIG. 6.

Figure 6:
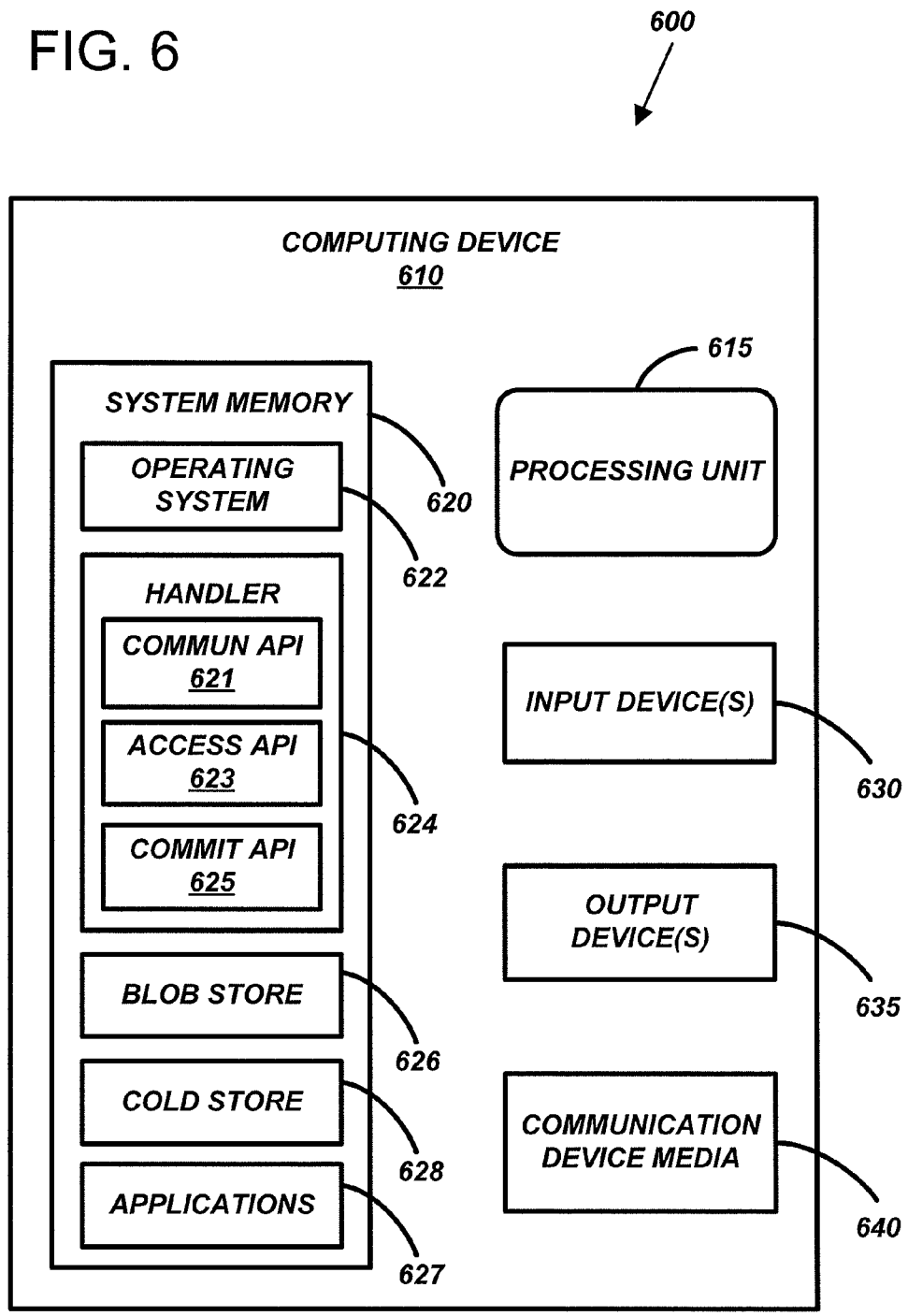
FIG. 6 is a schematic block diagram of an example embodiment of a storage system configured to implement the data processing and storage system of FIG. 5 in accordance with the principles of the present disclosure.

In FIG. 6, the example storage system 600 for implementing the principles of the disclosure includes a storage computing device, such as computing device 610. For example, the computing device 610 may include a server computer executing the SHAREPOINT® Server 2007 server program from MICROSOFT CORPORATION of Redmond, Wash. In other embodiments, however, the computing device 610 may include a network of server computers, a user computer, or any other device capable of performing data processing and storing data.

In a basic configuration, the computing device 610 typically includes at least one processing unit 615 for executing applications and processing data stored in system memory 620. Depending on the exact configuration and type of computing device 610, the system memory 620 may include, but is not limited to, RAM, ROM, EEPROM, flash memory, CD-ROM, digital versatile disks (DVD) or other optical storage devices, magnetic cassettes, magnetic tape, magnetic disk storage or other magnetic storage devices, or other memory technology.

System memory 620 typically stores an operating system 622, such as the WINDOWS® operating systems from MICROSOFT CORPORATION of Redmond, Wash., suitable for controlling the operation of the computing device 610. System memory 620 also may include a handler application 624, a blob storage 626, and a cold storage 628. The handler application 624 may include a communication application program interface ("COMMUN API") 621, an access API 623, and a commit API 625. The system memory 620 also may store one or more software applications 627, such as document management applications for storing and providing access to documents or document authoring applications for generating and editing documents.

Server computing device 610 also may include one or more input device(s) 630, such as a keyboard, mouse, pen, keypad, D-pad, scroll-wheel, jog-wheel, voice input device, touch input device, etc., for entering and manipulating data. Output device(s) 635, such as a display screen, speakers, printer, etc., also may be included with server computing device 610. These input devices 630 and output devices 635 are well known in the art and need not be discussed at length herein.

The server computing device 610 also may include communication device media 640 that allow the device 610 to communicate with other computing devices, for example, the user computing device 220 of FIG. 2, over a network in a distributed computing environment (e.g., an intranet or the Internet). By way of example, and not limitation, communication device media 640 includes wired media, such as a wired network or direct-wired connection, and wireless media, such as acoustic, RF, infrared and other wireless media.

Figure 7:
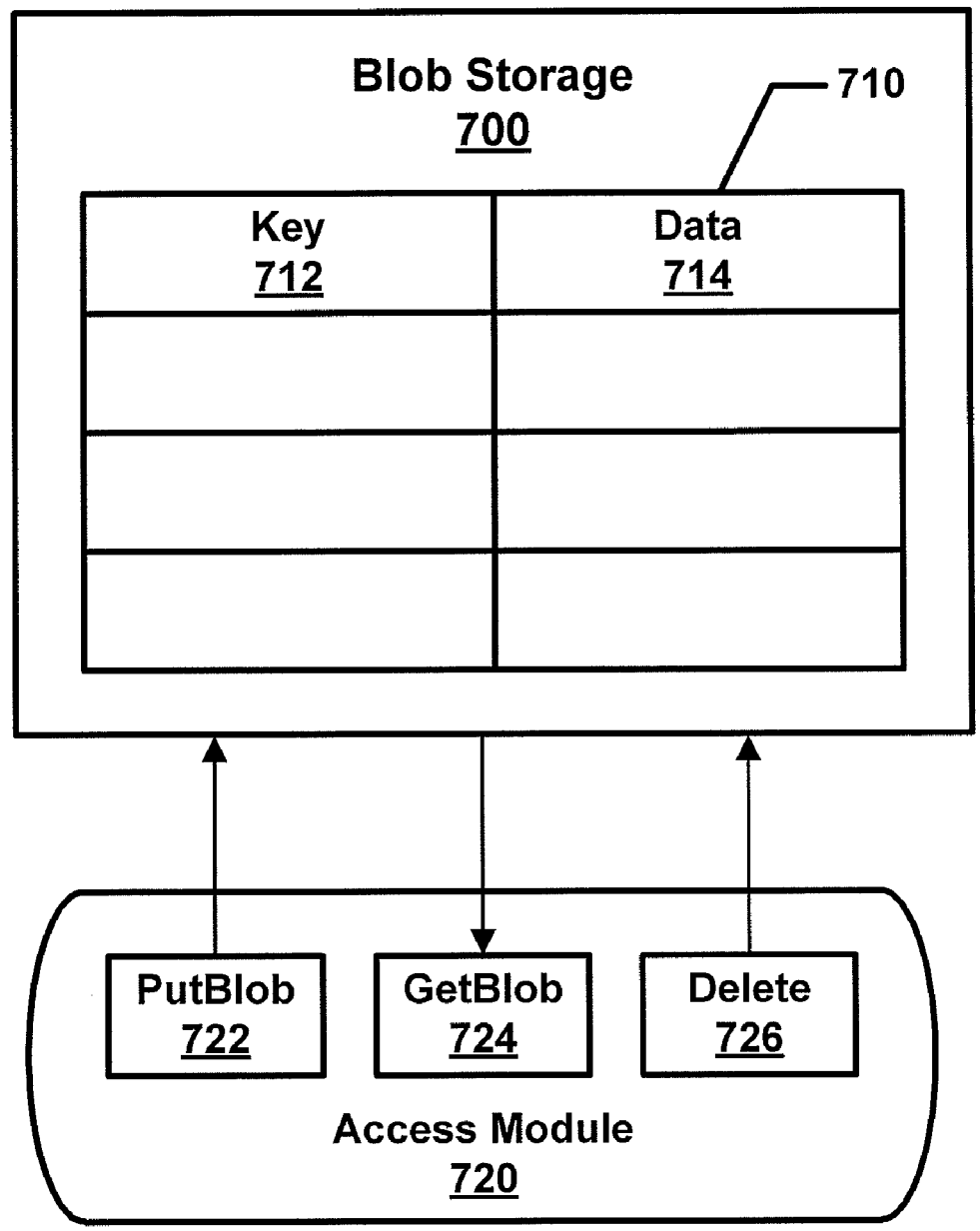
FIG. 7 is a schematic block diagram of an example blob storage and handler that are configured in accordance with the principles of the present disclosure.

Referring to FIGS. 7-11, example embodiments of a blob storage are disclosed. FIG. 7 is a schematic block diagram of an example blob storage 700. In the example shown, the blob storage 700 includes a blob database 710 having at least two data fields per data entry. In the example shown, each data field forms a column and each entry forms a row in the database 710. The first data field 712 may contain a unique data key and the second data field 714 may contain data to be saved. The data to be saved is accessible using the associated data key. In other embodiments, however, the blob storage 700 may be implemented using a different scheme.

In one embodiment, the unique data key is generated on a storage device implementing the blob storage 700. In an embodiment, the unique data key is generated by a handler, such as handler 540 of FIG. 5, when data to be stored is received by the handler. Some embodiments of the blob storage 700 store the received data as an arbitrary length binary string or BLOB. Advantageously, storing the data as a BLOB enables the blob storage 700 to remain agnostic to the file format of the data. In other embodiments, however, the data may be stored in the blob storage 700 in any suitable format.

As noted above, a handler (e.g., access handler 540 of FIG. 5) manages access to the blob storage using an access module (e.g., access module 542 of FIG. 5). One example of an access module for a blob storage 700 is provided in FIG. 7 at reference number 720. The access module 720 includes a PutBlob module 722, a GetBlob module 724, and a Delete module 726. The access module 720 uses the PubBlob module 722 to add data to the blob storage database 710. The access module 720 uses the GetBlob module 724 to read data from the blob storage database 710. The delete module 726 removes data from the blob storage database 710, for example, during a commit process.

FIG. 8 is a schematic block diagram of another example blob storage 800 that may be accessed by an access module, such as access module 720 of FIG. 7. The blob storage 800 includes a blob database 810 having three data fields per data entry. In general, the first data field 812 of each data entry stores a unique identification number (ID) and the second data field of each data entry stores a data blob. In one embodiment, the first data field 812 and the second data field 814 are the same as data fields 712, 714 of FIG. 7.

The blob database 810 also includes a third data field 816 for storing a data tag. In general, a data tag may include any information to be associated with the data blob in the second data field 814. For example, a data tag may include metadata about the data blob to be stored (e.g., a timestamp), any data provided by the application requesting storage of the data blob, metadata regarding the blob database 810, or any other data that may be useful to associate with the data blob in the second data field 814. In one embodiment, data tags enable an application (e.g., application 522 of FIG. 5) to index data blobs within the blob storage 800 with keys defined by the application as opposed to the unique data key stored in the first data field 812. For example, an application may use data tags to identify a page number, a paragraph number, a cell number, an object number, etc. of data within a data file.

Figure 9:
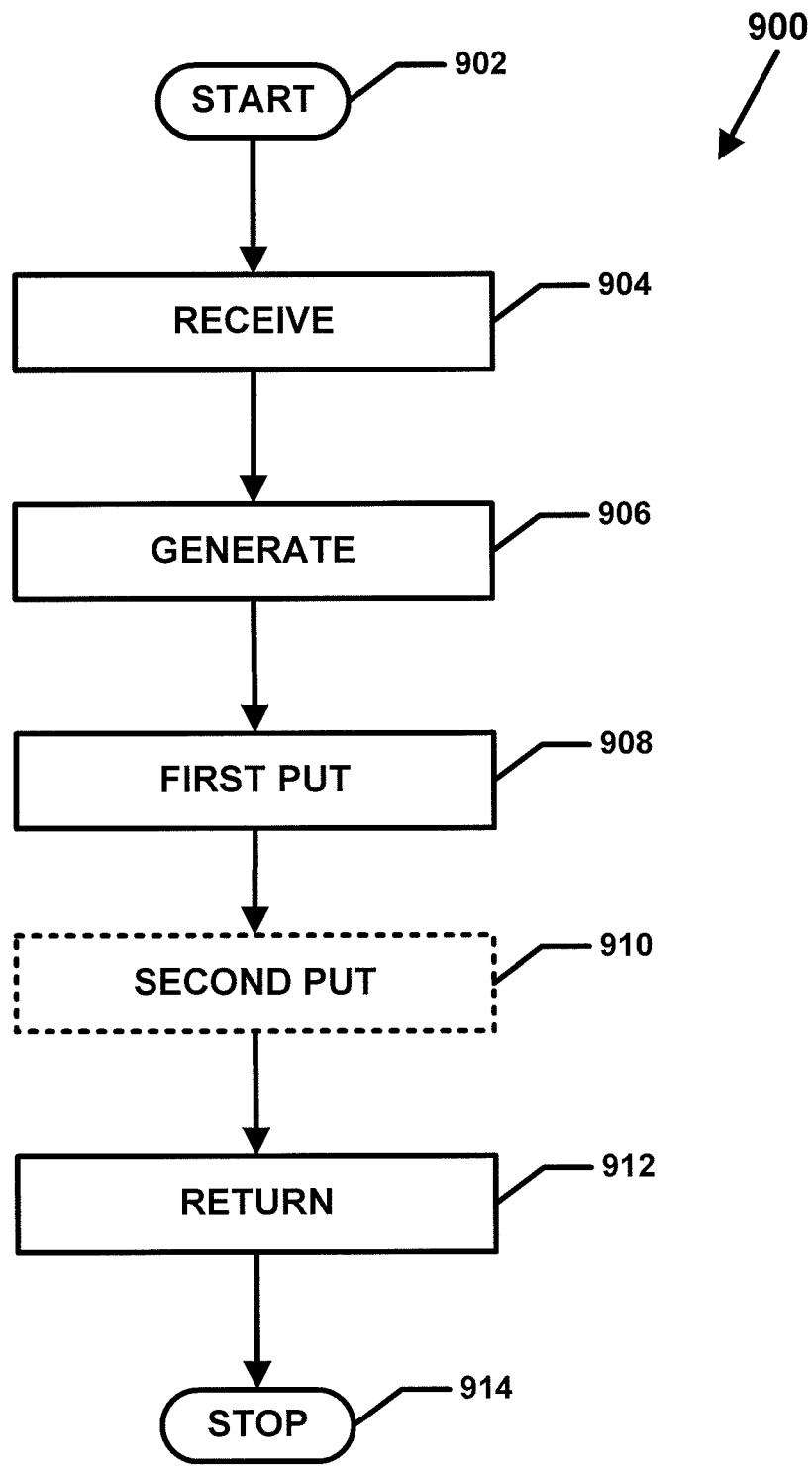

FIGS. 9-11 are flowcharts illustrating example access processes with which the access module 720 or handler may access a blob database, such as blob databases 710, 810. FIG. 9 illustrates an operational flow for an add process 900 by which an access module (e.g., the PubBlob module 722 of access module 720 of FIG. 7) may store data within the blob database (e.g., blob database 710 of FIG. 7).

The add process 900 initializes and begins at a start module 902 and proceeds to a receive operation 904. The receive operation 904 receives (e.g., from an application on a remote computing device) a request to add data to the blob data base 710, 810. Typically, the request includes the data to be stored.

A generate operation 906 creates a unique data key and adds the unique data key to a first data field (e.g., data field 712 of FIG. 7) in a new data entry. In one embodiment, the generate operation 906 generates a random number as the data key. In another embodiment, the generate operation 906 generates sequential data keys by which the order in which the data keys were generated may be determined. In other embodiments, however, the generate operation 906 may create any desired type of unique data key.

A first put operation 908 adds the data to be stored to a second data field (e.g., data field 714 of FIG. 7) of the data entry. In one embodiment, the first put operation 908 writes the data to the second data field as a BLOB regardless of the actual file format of the data received from the application or the file format of the data being processed by the application.

An optional second put operation 910 may add a tag to a third data field (e.g., data field 816 of FIG. 8) to the database entry. In one embodiment, the second put operation 910 obtains from the request received by the receive operation 904 a tag generated by the application requesting the storage of the data. In another embodiment, the second put operation 910 generates the tag based on the data to be stored. In other embodiments, however, the second put operation 910 may otherwise obtain the tag.

A return operation 912 returns the data key associated with the data. For example, in one embodiment, the return operation 912 sends the data key to an access module (e.g., access module 542 of FIG. 5). In an embodiment, the return operation 912 also returns a blob storage identifier (not shown). The access module uses the data key and optionally the blob storage identifier to subsequently access the data stored in the blob storage. The add process 900 completes and ends at a stop module 914.

In one embodiment, the access module enables requesting applications to remain agnostic of the blob storage database format. In another embodiment, the access module forwards the data key to a communication module (e.g., communication module 530 of FIG. 5), which forwards the data key to the requesting application for use in subsequently accessing the blob storage database 710, 810.

FIG. 10 illustrates an operational flow for a retrieve process 1000 by which an access module (e.g., GetBlob module 724 of access module 720 of FIG. 7) may read data from a blob storage (e.g., blob database 710 of blob storage 700 of FIG. 7) and returned to a requesting application. The retrieve process 1000 initializes and begins at a start module 1002 and proceeds to a receive operation 1004.

The receive operation 1004 receives a request from an application to retrieve data from the blob storage. In one embodiment, the receive operation 1004 also receives one or more data keys (e.g., a range of data keys) associated with the data to be retrieved. In another embodiment, the receive operation 1004 receives one or more tags (e.g., a range of tags) associated with the data to be retrieved. In other embodiments, the receive operation 1004 receives search conditions or other information by which the data to be retrieved may be identified.

A query operation 1006 searches the blob storage (e.g., blob database 710) using the received data key(s), the received tag(s), and/or other received information to obtain the associated data. For example, embodiments of the query operation 1006 may search the data entries in the blob storage for a particular data key, a range of data keys, or all data entries associated with a particular tag. In another embodiment, the query operation 1006 may search the blob storage for data entries meeting certain conditions, such as the most recent entry (e.g., highest data key in sequence), the oldest entry (e.g., lowest data key in sequence), the biggest entry (e.g., occupying most memory resources), or other such conditions.

A return operation 1008 sends the retrieved data to the requesting application. In some embodiments, the return operation 1008 passes the retrieved data to an access module. In one embodiment, the access module forwards the data to a communication module, which forwards the data to the requesting application. In another embodiment, the access module processes the data to satisfy an underlying file format and forwards the processed data to the requesting application. The retrieve process 1000 completes and ends at a stop module 1010.

FIG. 11 illustrates an operational flow for a delete process 1100 by which an access module (e.g., Delete module 726 of access module 720 of FIG. 7) may removed data from the blob database (e.g., blob database 710 of FIG. 7). For example, in one embodiment, data may be removed from the blob database when the data is transferred to cold storage. In another embodiment, data may be removed if a user chooses to "undo" modifications represented by the data.

The delete process 1100 initializes and begins at a start module 1102 and proceeds to a receive operation 1104. The receive operation 1104 receives a request to delete data from the blob storage (e.g., blob storage 700, 800 of FIGS. 7, 8, respectively). In one embodiment, the receive operation 1104 also receives one or more data keys associated with the data to be deleted. In another embodiment, the receive operation 1104 receives one or more tags associated with the data to be deleted. In another embodiment, the receive operation 1104 receives one or more data units to be deleted. In other embodiments, the receive operation 1104 may receive other information by which the data to be deleted may be identified.

A find operation 1106 accesses the blob storage database using the received data key(s), the received tag(s), the received data, and/or other received information to locate the data entries to be deleted. A remove operation 1108 removes the data associated with the data entries from the blob storage database. The delete process 1100 completes and ends at a stop module 1110.

Figure 12:
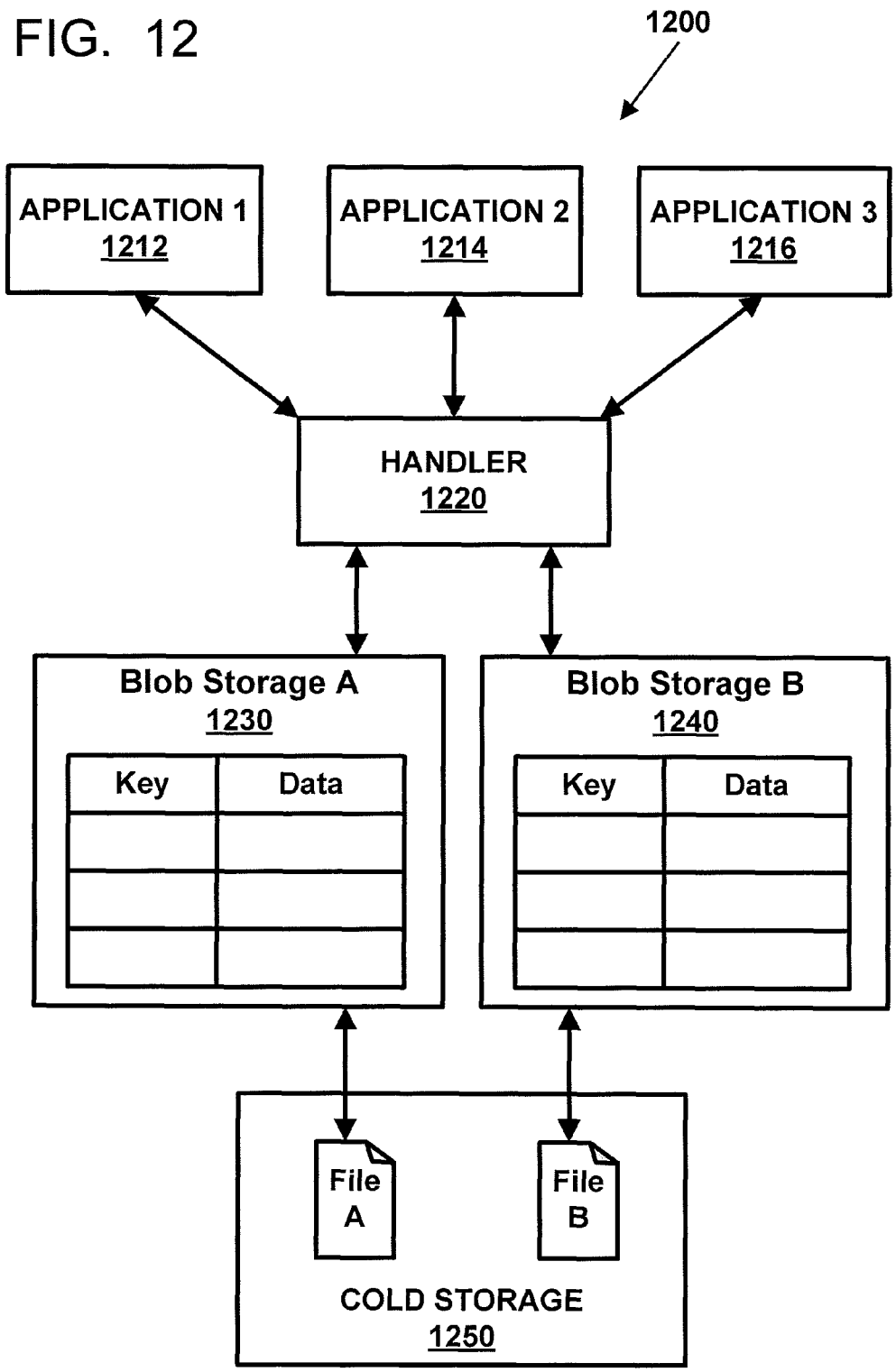
FIG. 12 is a schematic block diagram of a data storage system having features that are examples of inventive aspects configured in accordance with the principles of the present disclosure.

The principles of the present disclosure can be better understood by walking through an example application. FIG. 12 is a schematic block diagram of a data storage system 1200 having features that are examples of inventive aspects configured in accordance with the principles of the present disclosure. The data storage system 1200 includes a handler 1220 configured to communicate with one or more applications. In the example shown, the handler 1220 is configured to communicate with a first, second, and third application 1212, 1214, 1216, respectively. In other embodiments, however, the handler 1220 may communicate with any desired number of applications.

The handler 1220 enables the applications 1212, 1214, 1216 to access files stored on the data storage system 1200. For example, the handler 1220 may enable the applications 1212, 1214, 1216 to access (e.g., retrieve, save, modify, etc.) File A and/or File B stored in the cold storage 1250 of the data storage system 1200. The handler 1220 also manages when modifications made to files, such as File A and File B, are stored in blob storage (e.g., blob storages 1230, 1240) and when the modifications are coalesced and transferred to the cold storage 1250.

In general, each blob storage 1230, 1240 is associated with at least one data file stored in the cold storage 1250. In one embodiment, each blob storage 1230, 1240 may be associated with multiple cold data files. By associating a single blob storage with multiple cold data files, data updates common to the cold data files may be stored and committed efficiently (e.g., by tail merging the data). In other embodiments, however, each cold data file (e.g., File A and File B) may be associated with one or more unique blob storages (e.g., each of which may have a unique identifier). For example, each user editing a cold data file may have a unique blob storage (or section of a blob storage) for storing changes to the cold data file made by the user.

For ease in understanding in the example shown in FIG. 12, File A is associated with a first blob storage 1230 (shown as "Blob Storage A") and File B is associated with a second blob storage 1240 (shown as "Blob Storage B"). In one embodiment, each blob storage 1230, 1240 may be tied to its respective file A, B. For example, in one embodiment, if File A is transferred to a different storage device, then Blob Storage A 1230 also would be transferred. If File B is deleted, then Blob Storage B also would be emptied and/or deleted.

Figure 13:
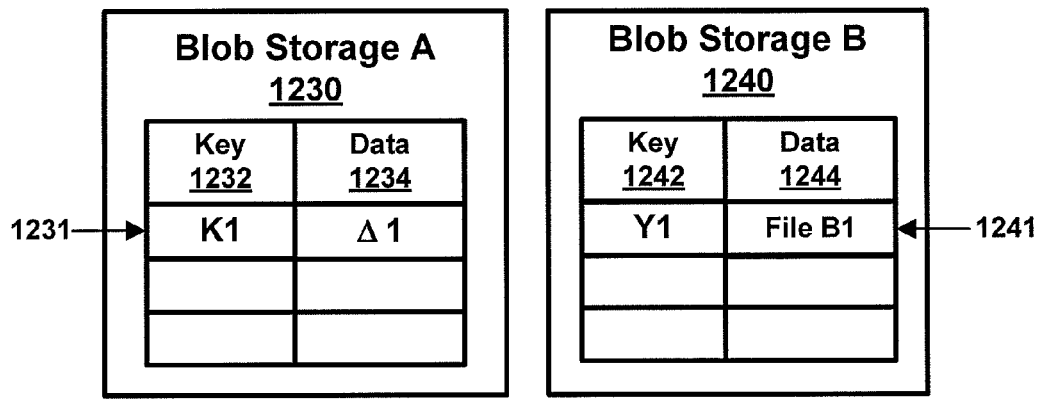
FIGS. 13-15 are schematic block diagrams illustrating the state of the first and second blob stores of FIG. 12 at different points during first and second editing sessions.
Figure 14:
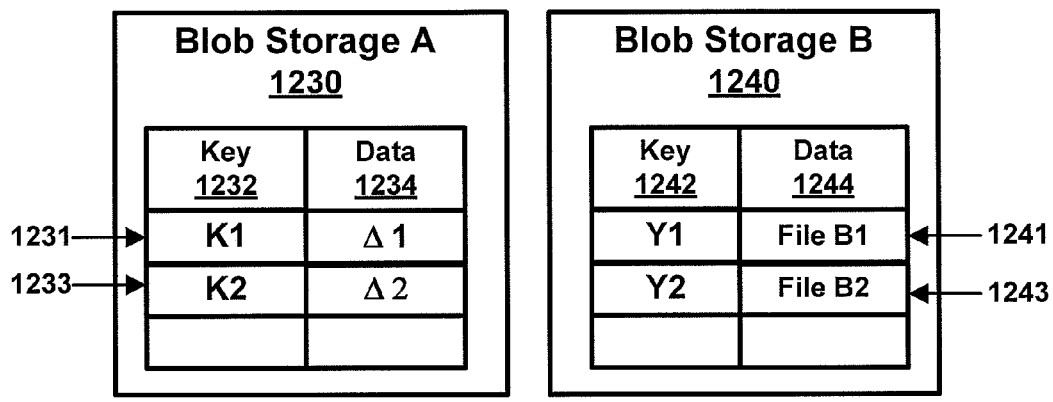
Figure 15:
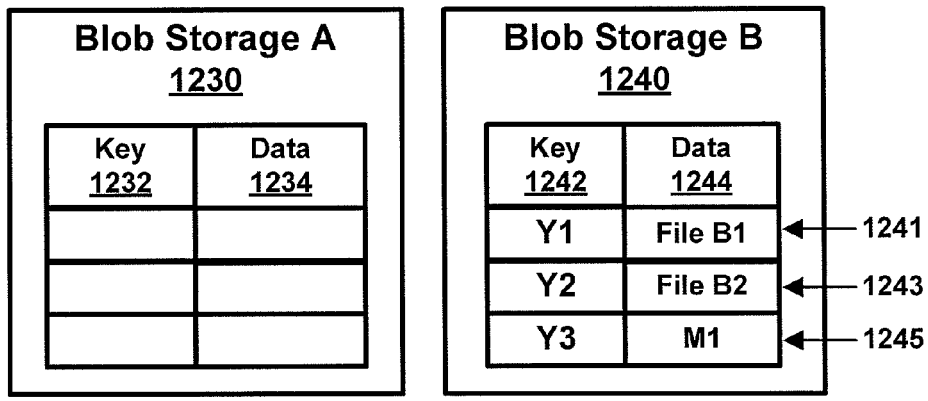

The following description will walk through some of the operational flows disclosed above to trace through a first example editing session in which the first and second applications 1212, 1214 edit File A and a second example editing session in which the third application 1216 edits File B. FIGS. 13-15 are schematic block diagrams illustrating the state of the first and second blob storages 1230, 1240 at different points during the first and second editing sessions.

In FIG. 12, the first and second blob stores 1230, 1240 are empty. Accordingly, at the beginning of the editing sessions, all data associated with File A is saved on the data storage system 1200 in the cold storage 1250 as File A and all data associated with File B is saved on the data storage system 1200 in the cold storage 1250 as File B.

With respect to the first editing session of File A, the handling process 300 (FIG. 3) initializes and begins at a start module 302 and proceeds to a receive operation 304. The receive operation 304 obtains from the first application 1212 data to be stored and instructions to store the data at the storage system 1200. In one embodiment, the receive operation 304 receives an incremental update for File A based on modifications made to File A by the first application 1212. The incremental update may be a content update and/or a metadata update.

An add operation 306 accesses the first blob storage 1230 and stores the received data (e.g., a delta file $\Delta 1$) in the first blob storage 1230 (see FIG. 13). One example process for implementing the add operation 306 of FIG. 3 is the add process 900 disclosed above with reference to FIG. 9. The add process 900 initializes and begins at a start module 902 and proceeds to a receive operation 904. The receive operation 904 receives a request to add the data $\Delta 1$ to the blob storage 1230.

A generate operation 906 creates a new data key (e.g., data key "K1") and adds the new data key K1 to a first data field 1232 in a new data entry 1231 (see FIG. 13). A first put operation 908 adds the data $\Delta 1$ to a second data field 1234 of the data entry 1231 (see FIG. 13). In the example shown, the first application 1212 did not send a tag to be associated with the data $\Delta 1$. Accordingly, the second put operation 910 of the add process 900 is skipped.

A return operation 912 returns the data key K1 associated with the data $\Delta 1$ to the handler 1220. In one embodiment, the return operation 912 also returns a blob storage identifier (not shown). Subsequently, the handler 1220 may use the returned data key K1 and optionally the blob storage identifier to access the data $\Delta 1$ while the data $\Delta 1$ is stored in the blob storage 1230. The add process 900 completes and ends at a stop module 914. The results of the add process 900 with respect to the blob storage 1230 are shown in FIG. 13.

Referring again back to handling process 300, a determination module 308 determines whether to commit the data (e.g., delta $\Delta 1$) stored in the blob storage 1230 to the cold storage 1250. In this example walkthrough, the determination module 308 determines the first application 1212 has not provided instructions to commit and no other commit criteria (e.g., time elapsed, size of blob storage, etc.) has been satisfied. Accordingly, the handling process 300 completes and ends at a stop module 312.

The handling process 300 repeats each time new storage instructions and data for File A are received from one of the applications 1212, 1214, 1216 during the first editing session. For example, when additional incremental changes $\Delta 2$ are received from the second application 1214, the handling process 300 initializes and begins again at the start module 302 and proceeds to the receive operation 304. The receive operation 304 obtains from the second application 1214 the data $\Delta 2$ to be stored and instructions to store the data $\Delta 2$ at the storage system 1200.

The add operation 306 accesses the first blob storage 1230 and stores the received data $\Delta 2$ in the first blob storage 1230 (see FIG. 14). For example, the add operation 306 may generate a new data key K2 and add the new data key K2 and the received data $\Delta 2$ to a second data entry 1233 of the first blob storage 1230 using the add process 900 as described above (see FIG. 14). The new data key K2 may be returned to the handler 1220. The results of the add operation 306 with respect to the blob storage 1230 are shown in FIG. 14.

The determination module 308 of handling process 300 determines whether to commit the data $\Delta 1$, $\Delta 2$ stored in the blob storage 1230 to the cold storage 1250. In this iteration of the walkthrough, the determination module 308 determines the instructions to commit the modifications to persistent storage have been received (e.g., from the second application 1214 of FIG. 12). Accordingly, the handling process 300 proceeds to a commit operation 310. In other embodiments, however, the determination module 308 may have determined not to commit the modifications and the handling process 300 would have ended as described above.

The commit operation 310 stores the data previously stored in the blob storage 1230 into the cold storage 1250. In the example shown, the blob storage 1230 is a global blob storage (e.g., is common to all accessing applications 1212, 1214). Accordingly, the commit instructions provided by the second application 1214 result in the transfer of data provided by both the first and second applications 1212, 1214 to the cold storage 1250. In other embodiments, however, each application may be associated with its own blob storage or partitioned section of the blob storage for a particular data file and, accordingly, may commit only its own instructions. The handling process 300 completes and ends at the stop module 312.

One example process for implementing the commit operation 310 of FIG. 3 is the commit process 400 disclosed above with reference to FIG. 4. The commit process 400 initializes and begins at a start module 402 and proceeds to a coalesce operation 404. The coalesce operation 404 gathers and integrates data that has been stored in the blob storage 1230.

In some embodiments, the coalesce operation 404 determines how the data stored in the blob storage 1230 relates to the data stored in the cold storage 1250. For example, the coalesce operation 404 may determine the data $\Delta 1$, $\Delta 2$ stored in the blob storage 1230 (see FIG. 14) represent incremental changes (e.g., of content and/or metadata changes) to File A. In such embodiments, the coalesce operation 404 instantiates the incremental changes into File A to form a modified File A (not shown).

An optional process operation 406 analyzes the data (e.g., modified File A) and determines whether any action should be taken before storing the data in the cold storage 1250. For example, security checks or property discovery may be performed. A store operation 408 saves the data (e.g., modified File A) into the cold storage 1250. In one embodiment, the store operation 408 replaces File A with modified File A. An empty operation 410 removes the transferred data from the blob storage 1230 (see FIG. 15). The commit process 400 completes and ends at a stop module 412.

One example process for implementing the empty operation 410 of the commit process 400 is the delete process 1100 disclosed above with reference to FIG. 11. The delete process 1100 initializes and begins at a start module 1102 and proceeds to a receive operation 1104. The receive operation 1104 receives a request to delete cold data (i.e., data that has been saved to the cold storage 1250) from the blob storage 1230 of FIG. 12. In this iteration of the example walkthrough, all data entries in the blob storage 1230 have been transferred to the cold storage 1250. In one embodiment, the receive operation 1104 receives instructions to delete all data entries of the blob storage 1230.

A find operation 1106 accesses the blob storage 1230 and a delete operation 1108 removes the data $\Delta 1$, $\Delta 2$ associated with the data entries 1231, 1233 of the blob storage 1230. In this example walkthrough, the find operation 1106 does not need to search the blob storage 1230 for specific data entries, but rather identifies all data entries 1231, 1233 containing data sets, such as $\Delta 1$, $\Delta 2$. The delete process 1100 completes and ends at a stop module 1110. The results of the commit process 400 with respect to the blob storage 1230 are shown in FIG. 15.

The disclosure will now walk through the second example editing session with respect to File B. The third application 1216 requests and receives content and metadata of File B from the handler 1220, which obtains File B from the cold storage 1250. The third application 1216 modifies the content and/or the metadata of File B to create a revised File B1.

The third application 1216 then sends File B1 as a complete data file to the handler 1220 for storage on the storage system 1200. When the handler 1220 receives the File B1 and the instructions to store the File B1, the handling process 300 (FIG. 3) initializes and begins at the start module 302 and proceeds to the receive operation 304. The receive operation 304 obtains File B1 at the handler 1220 from the third application 1216.

The add operation 306 accesses the second blob storage 1240 associated with the File B and stores the received data File B1 in the second blob storage 1240. For example, the add operation 306 may generate a new data key Y1 and add the new data key Y1 and the received data File B1 to a first data entry 1241 of the second blob storage 1240 using the add process 900 as described above (see FIG. 13). The new data key Y1 may be returned to the handler 1220.

The determination module 308 of handling process 300 determines whether to commit the data (e.g., File B1) stored in the blob storage 1240 to the cold storage 1250. In this iteration of the example walkthrough, the determination module 308 determines no instructions to commit data to persistent storage have been received (e.g., from any of the applications 1212, 1214, 1216 of FIG. 12). Accordingly, the handling process 300 completes and ends at a stop module 312. The results of the handling process 300 with respect to the blob storage 1240 are shown in FIG. 13.

The handling process 300 repeats each time new storage instructions and data for File B are received from one of the applications 1212, 1214, 1216. For example, when another revised copy File B2 of the document File B is sent from the third application 1216, the handling process 300 initializes and begins again at the start module 302 and proceeds to the receive operation 304. The receive operation 304 obtains from the third application 1216 the data File B2 to be stored and instructions to store the data File B2 on the storage system 1200.

The add operation 306 accesses the second blob storage 1240 and stores the received data File B2 in the first blob storage 1240. For example, the add operation 306 may generate a new data key Y2 and add the new data key Y2 and the received data File B2 to a second data entry 1243 of the second blob storage 1240 using the add process 900 as described above. The new data key Y2 may be returned to the handler 1220 for use in subsequent access requests for File B2. The results of the add operation 306 with respect to the blob storage 1250 are shown in FIG. 14.

The determination module 308 of handling process 300 determines whether to commit the data File B1, File B2 stored in the blob storage 1240 to the cold storage 1250. In this iteration of the example walkthrough, the determination module 308 determines instructions to commit the modifications represented by data File B1 and File B2 to persistent storage have been received. Accordingly, the handling process 300 completes and ends at a stop module 312.

On the third iteration of this example walkthrough for File B, one of the applications 1212, 1214, 1216 subsequently provides metadata M1 (e.g., a thumbnail image, an abstract summary, etc.) associated with File B for storage without providing instructions to commit the updates to persistent storage. The metadata is added to the blob storage 1240 using the processes described above for adding File B1 and File B2 (see FIG. 15). Accordingly, none of the data entries (e.g., File B1, File B2, M1) has been sent through the save pipeline yet. When the data File B1, File B2, M1 are finally committed, they may be coalesced (e.g., reorganized) into a single data file before being processed and stored into cold storage 1250, thereby saving time and/or system resources. In one embodiment, some of the data (e.g., metadata M1) may be deleted from the blob storage 1240 without being transferred to the cold storage 1250.

At any point during the editing sessions, one or more of the applications 1212, 1214, 1216 may access the data stored in the blob storages 1230, 1240. For example, if the first and second applications 1212, 1214 are simultaneously editing separate copies (not shown) of the document File A, then the first and second applications 1212, 1214 may synchronize their respective copies by each periodically checking for changes to File A saved to the storage system 1200 by the other application. In one embodiment, each application may send a timestamp (e.g., as a tag 816 of FIG. 8) to the handler 1220 with instructions to provide all data entries made since the time indicated by the timestamp.

One example process by which the data entries may be retrieved from the storage system 1200 is the retrieve process 1000 of FIG. 10. The retrieve process 1000 initializes and begins at a start module 1002 and proceeds to a receive operation 1004. The receive operation 1004 receives a request from one of the applications (e.g., via the handler 1220) to retrieve data from a blob storage (e.g., blob storage 1240 of FIGS. 12-15). In one embodiment, the receive operation 1004 receives a tag containing a timestamp associated with the most recent data entry known to the application.

A query operation 1006 searches the blob storage 1240 using the received timestamp to determine the data entry associated with the timestamp. The query operation 1006 also may determine which data entries were generated after the data entry associated with the timestamp and obtain the data from these data entries. A return operation 1008 sends the obtained data to the handler 1220, which may present the obtained data to the requesting application. In one embodiment, the handler 1220 organizes the obtained data into a file format known to the requesting application. The retrieve process 1000 completes and ends at a stop module 1010.

Embodiments of the disclosure may be implemented as a computer process (method), a computing system, or as an article of manufacture, such as a computer program product or computer readable media. The processes (programs) can be implemented in any number of ways, including the structures described in this document. One such way is by machine operations, of devices of the type described in this document. Another optional way is for one or more of the individual operations of the methods to be performed on a computing device in conjunction with one or more human operators performing some of the operations. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

We claim:

1. A method for updating a file maintained in cold storage, the method comprising:
   receiving at a first computing device a plurality of updates for the file from a plurality of computing devices for a first application;
   storing the updates from the plurality of computing devices temporarily at a blob storage on the first computing device, the updates being stored at the blob storage independently of an underlying file format of data in the updates, at least one of the updates being stored as an arbitrary length binary string, the arbitrary length binary string being different than the underlying file format of data in the at least one of the updates, the updates from the plurality of computing devices being stored temporarily at the blob storage until a commit instruction is received at the first computing device;
   receiving the commit instruction;
   retrieving at the first computing device at least a portion of the file from the cold storage in response to the commit instruction;
   retrieving at the first computing device at least a first update of the plurality of updates from the blob storage;
   integrating at the first computing device the first update with the portion of the file to generate an updated file, the integrating of the first update with the portion of the file being performed at the first computing device before the updated file is stored in the cold storage;
   performing at least one pre-storage process on the updated file, wherein the pre-storage process was not performed on the first update prior to storing the first update at the blob storage;
   storing the updated file in the cold storage;
   receiving a request at the first computing device from a second application to access the first update from the blob storage before the first update is integrated and stored in the cold storage;
   reading from the blob storage to obtain a copy of the first update; and
   sending the copy of the first update to the second application.

2. The method of claim 1, wherein performing at least one pre-storage process on the updated file further comprises performing an expensive pre-storage process on the updated file.

3. The method of claim 1, wherein retrieving at least the portion of the file from the cold storage comprises:
   sending a request for at least the portion of the file to a remote storage device on which the cold storage is maintained; and
   receiving at least the portion of the file from the remote storage device.

4. The method of claim 1, wherein integrating at least the first update with at least the portion of the file to generate the updated file comprises:
   identifying a file format of the file;
   identifying a relationship between the first update and at least the portion of the file; and
   integrating the first update with at least the portion of the file based on the file format of the file and the relationship between the first update and at least the portion of the file.

5. The method of claim 1, wherein storing the updated file in the cold storage comprises:
   identifying a file format of the updated file;
   determining an appropriate storage API from a plurality of storage APIs for storing the updated file based on the file format of the updated file; and
   storing the updated file in the cold storage using the appropriate storage API.

6. The method of claim 1, further comprising:
   receiving a removal request at the first computing device from the second application to remove the first update from the blob storage without committing the first update; and
   removing the first update from the blob storage.

7. A storage system for managing a first file, the storage system comprising:
   at least one computing device and memory;
   a blob storage, on a first computing device, configured to store data related to the first file temporarily and independently of an underlying file format of the data, the blob storage being configured to store a plurality of data entries from a plurality of computing devices, the blob storage storing at least one of the data entries as an arbitrary length binary string, the arbitrary length binary string being different than the underlying file format of the at least one of the data entries;
   a cold storage, on the first computing device, in which the first file is stored;
   a handler, on the first computing device, communicatively coupled to a plurality of applications, the handler being configured to store in the blob storage any data received from any of the applications and related to the first file, the handler being configured to store the data in the blob storage until a commit instruction is received, the handler also being configured to coalesce and process at least a portion of the data from the blob storage in response to receipt of the commit instruction, the coalescing and processing of the at least a portion of the data from the blob storage comprising integrating the at least a portion of the data from the blob storage with data obtained from the cold storage, the handler also being configured to retrieve any portion of the data from the blob storage and to send the portion of the data to a first one of the applications when the first application requests access to the portion of the data, wherein the handler is configured to coalesce and process at least the portion of the data from the blob storage by selecting an appropriate storage API from the plurality of storage APIs based on a file format of the first file, and
   a file format metadata storage containing file format metadata associated with the first file, the file format metadata indicating a file structure of the first file to enable incremental access to the first file.

8. The storage system of claim 7, wherein the cold storage is associated with at least one pre-storage process that is performed on any data being stored in the cold storage.

9. The storage system of claim 7, wherein the cold storage is maintained at a remote location from the blob storage.

10. The storage system of claim 7, wherein the cold storage is associated with a plurality of storage APIs, each storage API being configured to store a certain type of data in the cold storage.

11. The storage system of claim 7, wherein the handler is configured to search the blob storage for data in response to access requests received from one of the applications.

12. A computer readable storage memory encoding instructions for implementing a computer method of updating a master copy of a document, the method comprising:

receiving at a first storage device from a plurality of computing devices a plurality of incremental updates for the document, each incremental update being received from one of a plurality of applications, wherein at least two of the incremental updates are received from different applications;

storing the incremental updates from the plurality of computing devices at a blob storage on the first storage device, the incremental updates being stored at the blob storage independently of an underlying file format of data in the incremental updates, at least one of the incremental updates being stored as an arbitrary length binary string, the arbitrary length binary string being different than the underlying format of the at least one incremental update, and the incremental updates being stored at a same database table in the blob storage, the updates from the plurality of computing devices being stored temporarily at the blob storage until a commit instruction is received at the first computing device;

receiving at the first storage device the commit instruction;

retrieving at the first storage device the master copy of the document from a cold storage in response to receiving the commit instruction;

coalescing at the first storage device the incremental updates with the retrieved master copy of the document to create an updated master copy of the document, the coalescing including integrating the incremental updates with the retrieved master copy of the document, the integrating of the incremental updates with the retrieved master copy of the document being performed before the updated master copy of the document is stored in the cold storage; and storing the updated master copy of the document in the cold storage in place of the master copy of the document receiving an access request from one of the applications to read from the master copy of the document prior to receiving the commit instruction;

analyzing the incremental updates stored in the blob storage to determine whether any of the incremental updates satisfy the access request;

sending a copy of any incremental update satisfying the access request;

retrieving at least a relevant portion of the master copy of the document from the cold storage if none of the incremental updates satisfies the access request;

receiving from one of the applications a tag associated with one of the incremental updates; and storing the tag in the blob storage in association with the incremental update, the incremental update being searchable within the blob storage by the tag.

13. The computer readable storage memory of claim 12, further comprising: emptying the blob storage when the updated master copy is stored in the cold storage.

* * * * *